US012302151B2

(12) United States Patent
Bai et al.

(10) Patent No.: US 12,302,151 B2
(45) Date of Patent: May 13, 2025

(54) USER EQUIPMENT PROCESSING CAPABILITY ASPECTS FOR CROSS-LINK INTERFERENCE MEASUREMENT

(71) Applicant: QUALCOMM Incorporated, San Diego, CA (US)

(72) Inventors: Tianyang Bai, Somerville, NJ (US); Yan Zhou, San Diego, CA (US); Qian Zhang, Basking Ridge, NJ (US); Junyi Li, Fairless Hills, PA (US); Tao Luo, San Diego, CA (US)

( * ) Notice: Subject to any disclaimer, the term of this patent is extended or adjusted under 35 U.S.C. 154(b) by 325 days.

(21) Appl. No.: 17/715,725

(22) Filed: Apr. 7, 2022

(65) Prior Publication Data

US 2023/0328564 A1 Oct. 12, 2023

(51) Int. Cl.
| | |
|---|---|
| H04W 24/10 | (2009.01) |
| H04B 17/336 | (2015.01) |
| H04L 5/00 | (2006.01) |
| H04W 72/23 | (2023.01) |

(52) U.S. Cl.
CPC .......... *H04W 24/10* (2013.01); *H04B 17/336* (2015.01); *H04L 5/0048* (2013.01); *H04W 72/23* (2023.01)

(58) Field of Classification Search
CPC ... H04B 17/336; H04B 17/345; H04L 5/0048; H04L 5/0053; H04L 5/0057; H04L 5/0062; H04W 24/10; H04W 72/23
USPC ........................................................ 370/329
See application file for complete search history.

(56) References Cited

U.S. PATENT DOCUMENTS

| | | | |
|---|---|---|---|
| 2021/0067991 A1* | 3/2021 | Zhu | H04W 8/24 |
| 2022/0263641 A1* | 8/2022 | Xie | H04L 5/0091 |
| 2024/0049252 A1* | 2/2024 | Gulati | H04W 72/40 |
| 2024/0089019 A1* | 3/2024 | Xu | H04B 17/328 |
| 2024/0114489 A1* | 4/2024 | Liu | H04W 74/0833 |

FOREIGN PATENT DOCUMENTS

| | | |
|---|---|---|
| WO | WO-2022032522 A1 | 2/2022 |
| WO | WO-2022055816 A1 | 3/2022 |

OTHER PUBLICATIONS

International Search Report and Written Opinion—PCT/US2023/015692—ISA/EPO—Jun. 20, 2023.
Nokia et al., "UE CLI Measurement Configuration and Reporting", 3GPP TSG-RAN2#106, R2-1906637, 3rd Generation Partnership Project (3GPP), Mobile Competence Centre, 650, Route Des Lucioles, F-06921, Sophia-Antipolis Cedex, France, Reno, USA, May 13, 2019-May 17, 2019, 5 Pages, May 17, 2019, Sections 1-3, 2-3, 3.

(Continued)

*Primary Examiner* — Robert J Lopata

(57) ABSTRACT

Methods, systems, and devices for wireless communications are described. A user equipment (UE) may transmit control signaling indicating a processing capability of the UE for cross-link interference measurement and reporting. The UE may receive, in response to the control signaling indicating the processing capability, control signaling indicating a configuration of the UE for the cross-link interference measurement and reporting. The UE may transmit, to a network entity, a message indicating a cross-link interference measurement generated by the UE according to the configuration.

28 Claims, 23 Drawing Sheets

(56) References Cited

OTHER PUBLICATIONS

Qualcomm Incorporated: "CLI Measurements UE Capabilities", 3GPP TSG-RAN2 Meeting #107-Bis, R2-1913392_CLI Capability-V2, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019, XP051804971, 3 Pages, Paragraph 2, 3, Section 1, 2, 2.1-2.3.

* cited by examiner

USER EQUIPMENT PROCESSING CAPABILITY ASPECTS FOR CROSS-LINK INTERFERENCE MEASUREMENT

FIELD OF TECHNOLOGY

The following relates to wireless communications, including user equipment (UE) processing capability aspects for cross-link interference measurement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE). In some examples of a wireless communications system, neighboring communication devices may transmit or receive communications concurrently, which my lead to cross-link interference.

SUMMARY

The described techniques relate to improved methods, systems, devices, and apparatuses that support user equipment (UE) processing capability aspects for cross-link interference measurement. For example, the described techniques provide for configuring a UE for cross-link interference measurement and reporting based on UE processing capabilities. The UE may transmit control signaling indicating a processing capability of the UE for cross-link interference measurement and reporting. The UE may receive, in response to the control signaling indicating the processing capability, control signaling indicating a configuration of the UE for the cross-link interference measurement and reporting. The UE may transmit, to a network entity, a message indicating a cross-link interference measurement generated by the UE according to the configuration.

A method for wireless communication at a UE is described. The method may include transmitting control signaling indicating a processing capability of the UE for cross-link interference measurement and reporting, receiving, at least in part in response to the control signaling indicating the processing capability, control signaling indicating a configuration of the UE for the cross-link interference measurement and reporting, and transmitting, to a network entity, a message indicating a cross-link interference measurement generated by the UE according to the configuration.

An apparatus for wireless communication at a UE is described. The apparatus may include a processor, memory coupled with the processor, and instructions stored in the memory. The instructions may be executable by the processor to cause the apparatus to transmit control signaling indicating a processing capability of the UE for cross-link interference measurement and reporting, receive, at least in part in response to the control signaling indicating the processing capability, control signaling indicating a configuration of the UE for the cross-link interference measurement and reporting, and transmit, to a network entity, a message indicating a cross-link interference measurement generated by the UE according to the configuration.

Another apparatus for wireless communication at a UE is described. The apparatus may include means for transmitting control signaling indicating a processing capability of the UE for cross-link interference measurement and reporting, means for receiving, at least in part in response to the control signaling indicating the processing capability, control signaling indicating a configuration of the UE for the cross-link interference measurement and reporting, and means for transmitting, to a network entity, a message indicating a cross-link interference measurement generated by the UE according to the configuration.

A non-transitory computer-readable medium storing code for wireless communication at a UE is described. The code may include instructions executable by a processor to transmit control signaling indicating a processing capability of the UE for cross-link interference measurement and reporting, receive, at least in part in response to the control signaling indicating the processing capability, control signaling indicating a configuration of the UE for the cross-link interference measurement and reporting, and transmit, to a network entity, a message indicating a cross-link interference measurement generated by the UE according to the configuration.

In some examples of the method, apparatuses, and non-transitory computer-readable medium described herein, transmitting the control signaling indicating the processing capability may include operations, features, means, or instructions for transmitting control signaling indicating a quantity of reference signals measurable by the UE for a slot.

In some examples of the method, apparatuses, and non-transitory computer-readable medium described herein, transmitting the control signaling indicating the processing capability may include operations, features, means, or instructions for transmitting control signaling indicating a processing power capability of the UE associated with cross-link interference measurement and reporting.

In some examples of the method, apparatuses, and non-transitory computer-readable medium described herein, the processing power capability of the UE may be per resource for cross-link interference measurement and reporting.

In some examples of the method, apparatuses, and non-transitory computer-readable medium described herein, transmitting the control signaling indicating the processing capability may include operations, features, means, or instructions for transmitting control signaling indicating a time duration for processing associated with cross-link interference measurement and reporting.

In some examples of the method, apparatuses, and non-transitory computer-readable medium described herein, transmitting the control signaling indicating the processing capability may include operations, features, means, or instructions for transmitting control signaling indicating an amount of processing available to the UE for cross-link interference measurement and reporting.

Some examples of the method, apparatuses, and non-transitory computer-readable medium described herein may further include operations, features, means, or instructions for determining that the processing available to the UE for cross-link interference measurement and reporting fails to satisfy a threshold and determining whether to transmit the message indicating the cross-link interference measurement or a second message indicating a channel state information measurement based on the processing available failing to satisfy the threshold and comparing a first priority associated with the cross-link interference measurement and a second priority associated with the channel state information measurement.

In some examples of the method, apparatuses, and non-transitory computer-readable medium described herein, transmitting the control signaling indicating the processing capability may include operations, features, means, or instructions for transmitting control signaling indicating a processing timeline for a control message that triggers a cross-link interference measurement, the cross-link interference measurement, a cross-link interference report, or any combination thereof.

In some examples of the method, apparatuses, and non-transitory computer-readable medium described herein, the control signaling indicating the processing timeline includes a first value associated with a first time interval from the control message that triggers the cross-link interference measurement to the cross-link interference report, a second value associated with a second time interval from the cross-link interference measurement and the cross-link interference report, or any combination thereof.

In some examples of the method, apparatuses, and non-transitory computer-readable medium described herein, transmitting the message indicating the cross-link interference measurement may include operations, features, means, or instructions for identifying a priority associated with the message indicating the cross-link interference measurement and transmitting the message indicating the cross-link interference measurement according to the priority.

In some examples of the method, apparatuses, and non-transitory computer-readable medium described herein, the priority associated with the message indicating the cross-link interference measurement includes a first priority and the method, apparatuses, and non-transitory computer-readable medium may include further operations, features, means, or instructions for identifying a second priority associated with a channel state information message to be transmitted on a same set of resources as the message indicating the cross-link interference measurement and determining to transmit the message indicating the cross-link interference measurement and refrain from transmitting the channel state information message based on comparing the first priority to the second priority.

In some examples of the method, apparatuses, and non-transitory computer-readable medium described herein, the first priority may be associated with both the message indicating the cross-link interference measurement and at least one type of channel state information message.

Some examples of the method, apparatuses, and non-transitory computer-readable medium described herein may further include operations, features, means, or instructions for receiving, on a downlink control channel according to the configuration, a downlink control information (DCI) message that triggers a cross-link interference measurement, receiving one or more reference signals on a set of cross-link interference measurement resources according to the configuration and the DCI message, and generating the cross-link interference measurement based on the one or more reference signals, where the message indicating the cross-link interference measurement may be transmitted on an uplink control channel or an uplink shared channel.

A method for wireless communication at a network entity is described. The method may include obtaining control signaling indicating a processing capability of a UE for cross-link interference measurement and reporting, outputting, at least in part in response to the control signaling indicating the processing capability, control signaling indicating a configuration of the UE for the cross-link interference measurement and reporting, and obtaining, from the UE, a message indicating a cross-link interference measurement and configured according to the configuration.

An apparatus for wireless communication at a network entity is described. The apparatus may include a processor, memory coupled with the processor, and instructions stored in the memory. The instructions may be executable by the processor to cause the apparatus to obtain control signaling indicating a processing capability of a UE for cross-link interference measurement and reporting, output, at least in part in response to the control signaling indicating the processing capability, control signaling indicating a configuration of the UE for the cross-link interference measurement and reporting, and obtain, from the UE, a message indicating a cross-link interference measurement and configured according to the configuration.

Another apparatus for wireless communication at a network entity is described. The apparatus may include means for obtaining control signaling indicating a processing capability of a UE for cross-link interference measurement and reporting, means for outputting, at least in part in response to the control signaling indicating the processing capability, control signaling indicating a configuration of the UE for the cross-link interference measurement and reporting, and means for obtaining, from the UE, a message indicating a cross-link interference measurement and configured according to the configuration.

A non-transitory computer-readable medium storing code for wireless communication at a network entity is described. The code may include instructions executable by a processor to obtain control signaling indicating a processing capability of a UE for cross-link interference measurement and reporting, output, at least in part in response to the control signaling indicating the processing capability, control signaling indicating a configuration of the UE for the cross-link interference measurement and reporting, and obtain, from the UE, a message indicating a cross-link interference measurement and configured according to the configuration.

In some examples of the method, apparatuses, and non-transitory computer-readable medium described herein, obtaining the control signaling indicating the processing capability may include operations, features, means, or instructions for obtaining control signaling indicating a quantity of reference signals measurable by the UE for a slot.

In some examples of the method, apparatuses, and non-transitory computer-readable medium described herein, obtaining the control signaling indicating the processing capability may include operations, features, means, or instructions for obtaining control signaling indicating a processing power capability of the UE associated with cross-link interference measurement and reporting.

In some examples of the method, apparatuses, and non-transitory computer-readable medium described herein, obtaining the control signaling indicating the processing capability may include operations, features, means, or instructions for obtaining control signaling indicating a time duration for processing associated with cross-link interference measurement and reporting.

In some examples of the method, apparatuses, and non-transitory computer-readable medium described herein, obtaining the control signaling indicating the processing capability may include operations, features, means, or instructions for obtaining control signaling indicating an amount of processing available to the UE for cross-link interference measurement and reporting.

In some examples of the method, apparatuses, and non-transitory computer-readable medium described herein, obtaining the control signaling indicating the processing capability may include operations, features, means, or instructions for obtaining control signaling indicating a processing timeline for a control message that triggers a cross-link interference measurement, the cross-link interference measurement, a cross-link interference report, or any combination thereof.

In some examples of the method, apparatuses, and non-transitory computer-readable medium described herein, obtaining the message indicating the cross-link interference measurement may include operations, features, means, or instructions for identifying a priority associated with the message indicating the cross-link interference measurement and obtaining the message indicating the cross-link interference measurement according to the priority.

Some examples of the method, apparatuses, and non-transitory computer-readable medium described herein may further include operations, features, means, or instructions for outputting, on a downlink control channel according to the configuration, a DCI message that triggers a cross-link interference measurement and outputting one or more reference signals on a set of cross-link interference measurement resources according to the configuration and based on the DCI message, where the message indicating the cross-link interference measurement may be received on an uplink control channel or an uplink shared channel at least in part in response to the one or more reference signals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
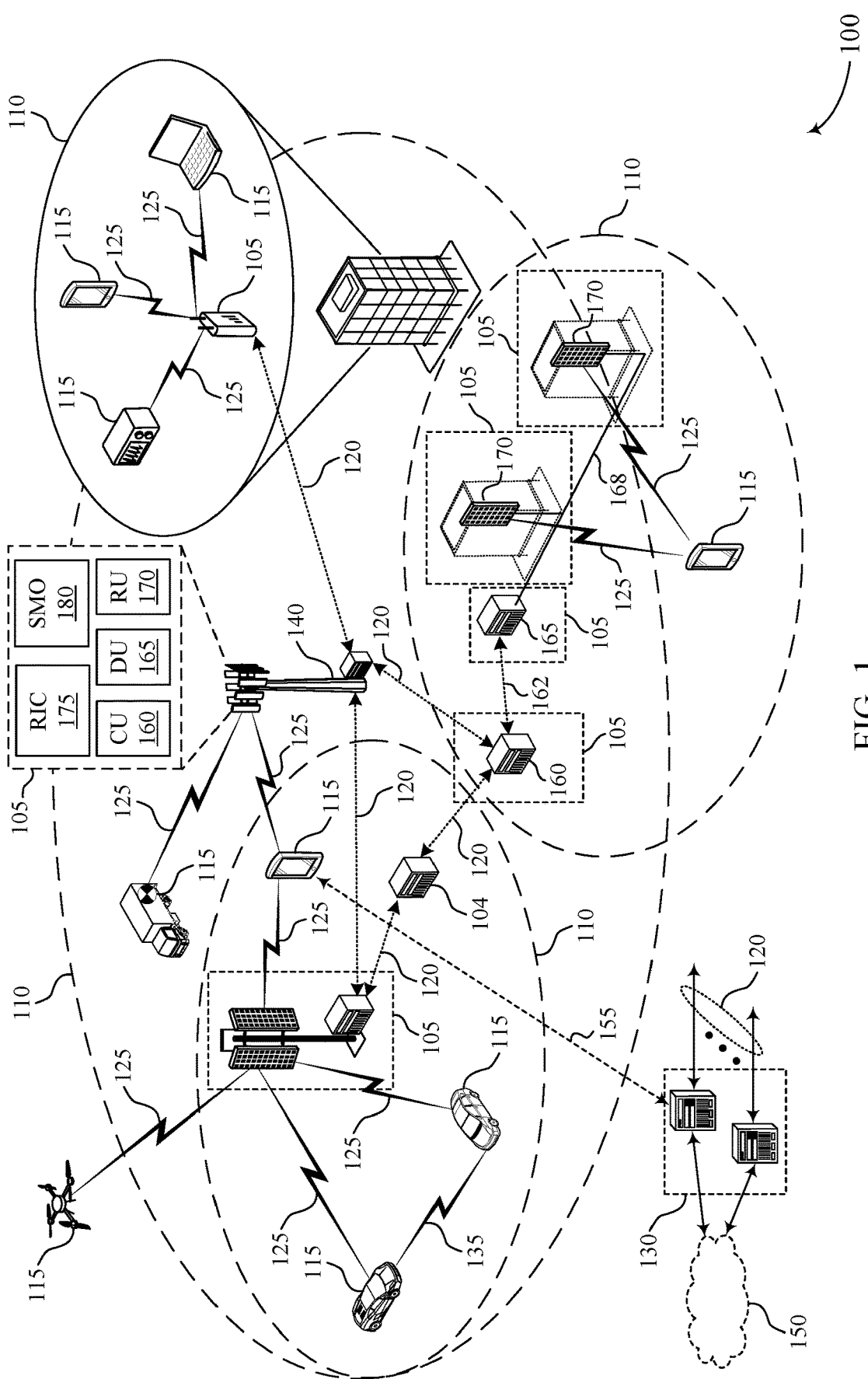
FIG. 1 illustrates an example of a wireless communications system that supports user equipment (UE) processing capability aspects for cross-link interference measurement in accordance with one or more aspects of the present disclosure.

In some wireless communications systems, a communication device, such as a user equipment (UE) or a network entity, may support wireless communications over one or multiple radio access technologies. Examples of radio access technologies may include fourth generation (4G) systems, such as Long Term Evolution (LTE) systems, and fifth generation (5G) systems, which may be referred to as New Radio (NR) systems. In such cases, the communication device may operate in a half-duplex mode or a full-duplex mode, or a combination thereof. In a half-duplex mode, the communication device may either transmit communications or receive communications during a time period, such as a transmission time interval (TTI) that may span one or more time resources (e.g., symbols, mini-slots, slot, etc.). In a full-duplex mode, the communication device may simultaneously transmit and receive communications during the time period. That is, communications received by the communication device may overlap in the time domain with communications transmitted by the communication device. For example, symbols occupied by received signals may overlap with symbols occupied by transmitted signals.

In some examples, neighboring communication devices (e.g., UEs, network entities) may perform full-duplex communications or half-duplex communications (e.g., using time division duplexing (TDD)) concurrently, such that communications received by a first communication device may overlap in time with communications transmitted by a second communication device (e.g., a neighboring communication device). In such an example, the communications transmitted by the second communication device may interfere with the communications received at the first communication device. Such interference may be referred to as cross-link interference. In some examples, cross-link interference may degrade wireless communications between the first communication device and the network. Therefore, to mitigate effects of cross-link interference, the network may configure the first communication device to measure and report cross-link interference.

In some examples, the network may configure a communication device (e.g., a UE) to perform cross-link interference reporting via higher layer (e.g., layer 3 (L3), radio resource control (RRC) layer) signaling. In some examples, however, higher layer signaling may be relatively inflexible and associated with an increased latency (e.g., relative to lower layer signaling) due to updating a higher layer cross-link interference configuration. As such, higher layer cross-link interference reporting may not be (or be less) suitable for scenarios in which cross-link interference changes dynamically relative the increased latency associated with higher layer configuration signaling. Moreover, higher layer cross-link interference measurements may lack spatial granularity, for example such that higher layer cross-link interference reporting may not capture beam-level cross-link interference.

In other examples, the network may configure the UE to measure and report cross-link interference via lower layer (e.g., layer 1 (L1), physical (PHY) layer, layer 2 (L2), media access control (MAC) layer) signaling, thereby increasing the flexibility and decreasing the latency of cross-link interference reporting (e.g., relative to higher layer cross-link interference reporting). In some examples, however, lower layer signaling may occur over a relatively short time scale and result in increased processing at the UE (e.g., relative to higher layer signaling). Moreover, processing capabilities of the UE may not be capable of supporting some lower layer signaling requests (e.g., from the network) for cross-link interference measurement and reporting.

Various aspects of the present disclosure generally relate to techniques for UE processing capability aspects for cross-link interference measurement, and more specifically, to techniques for configuring a UE for cross-link interference measurement and reporting based on UE processing capabilities. For example, the UE may report one or more processing capabilities of the UE to the network for cross-link interference measurement and reporting. The UE processing capabilities may include a quantity (e.g., a maximum quantity or an otherwise suitable number) of time and frequency resources (e.g., per time duration) over which the UE may be capable of measuring cross-link interference, an amount of processing power consumed by the UE (e.g., per resource) to measure and report cross-link interference, an amount of processing power available to the UE for measuring and reporting cross-link interference, or a time duration for processing (e.g., by the UE) associated with cross-link interference measurement and reporting, among other examples. The network may configure the UE to measure and report cross-link interference based on the UE processing capabilities reported to the network. In some examples, the network may configure the UE with one or more rules to be used by the UE for prioritize the cross-link interference reporting relative to other uplink control information reporting, such as channel state information reporting. For example, the UE may transmit an indication of cross-link interference measurements (e.g., a cross-link interference report) with (or in) a cross-link interference report based on a priority of the cross-link interference report relative to the channel state information report.

Particular aspects of the subject matter described herein may be implemented to realize one or more of the following potential advantages. The techniques employed by the described communication devices may provide benefits and enhancements to the operation of the communication devices, including configuring a communication device, such as a UE, for cross-link interference measurement and reporting based on processing capabilities of the communication device. Further, UE processing capability aspects for cross-link interference measurement, as described herein, may support higher data rates, spectrum efficiency enhancement, and efficient resource utilization, thereby improving throughput and reliability. Such techniques may therefore lead to improved network operations and network efficiencies, among other benefits.

Aspects of the disclosure are initially described in the context of wireless communications systems. Aspects of the disclosure are also described in the context of a network architecture, another wireless communications system, a media access control control element (MAC-CE), timing diagrams, and process flows. Aspects of the disclosure are further illustrated by and described with reference to apparatus diagrams, system diagrams, and flowcharts that relate to UE processing capability aspects for cross-link interference measurement.

FIG. 1 illustrates an example of a wireless communications system 100 that supports UE processing capability aspects for cross-link interference measurement in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support UE processing capability aspects for cross-link interference measurement as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The wireless communications system 100 may support techniques for configuring a UE for cross-link interference measurement and reporting based on UE processing capabilities. For example, a UE 115 may transmit control signaling indicating a processing capability of the UE 115 for cross-link interference measurement and reporting. In response to the control signaling capability indicating the processing capability of the UE 115, the UE 115 may receive control signaling from a network entity 105 indicating a configuration of the UE 115 for the cross-link interference measurement and reporting. The UE 115 may transmit, to the network entity 105, a message indicating a cross-link interference measurement generated by the UE 115 according to the configuration. In some examples, by configuring the UE 115 for cross-link interference measurement and reporting based on UE processing capabilities, the network may reduce processing and increase performance at the UE 115, among other benefits.

Figure 2:
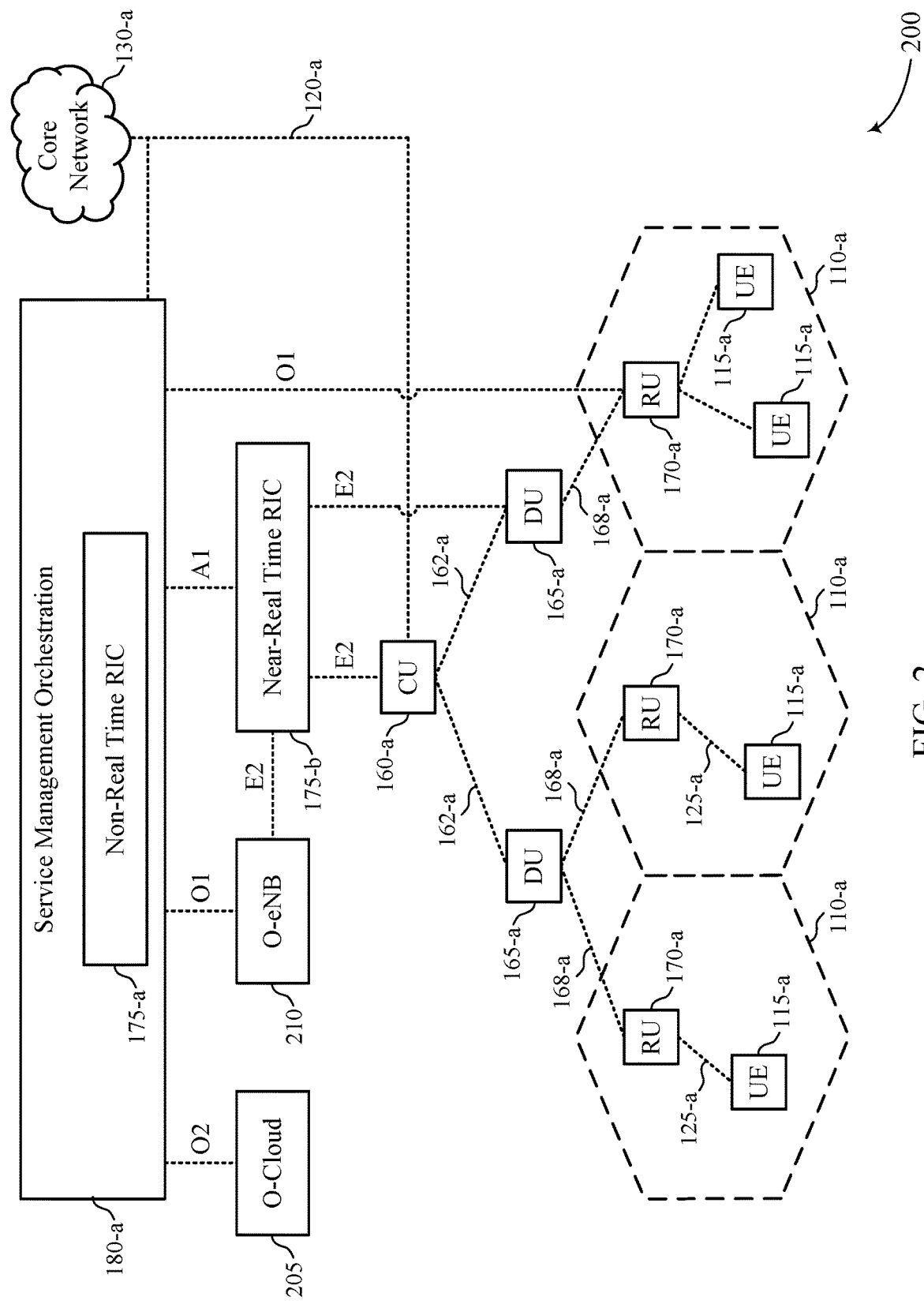
FIG. 2 illustrates an example of a network architecture that supports UE processing capability aspects for cross-link interference measurement in accordance with one or more aspects of the present disclosure.

FIG. 2 illustrates an example of a network architecture 200 that (e.g., a disaggregated base station architecture, a disaggregated RAN architecture) that supports UE processing capability aspects for cross-link interference measurement in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The network architecture 200 may support UE processing capability aspects for cross-link interference measurement. In some examples, a network entity (e.g., a CU 160-*a*, a DU 165-*a*, an RU 170-*a* or the like) may configure a UE 115-*a* to perform cross-link interference reporting via higher layer signaling. In some examples of higher layer cross-link interference reporting, the CU 160-*a* may obtain a cross-link interference report from the UE 115-*a* via the DU 165-*a*. In some examples, however, communicating the cross-link interference report between the CU 160-*a* and the DU 165-*a* (e.g., via the fronthaul communication link 168-*a*) may lead to increased latency relative to lower layer (e.g., L1, PHY layer, L2, MAC layer) signaling, in which information may be obtained from the UE 115 by the DU 165-*a*.

Therefore, to reduce latency associated with cross-link interference reporting, the network may configure the UE 115-*a* to report cross-link interference measurements via lower layer signaling. In some examples, these techniques may reduce latency associated with cross-link interference reporting. For example, the network entity (e.g., the DU 165-*a*, the RU 170-*a*) may output control signaling indicating a set of cross-link interference measurement occasions and a set of receive beams associated with the set of cross-link interference measurement occasions for the UE 115-*a* to use to generate a cross-link interference report. The network entity (e.g., the DU 165-*a*, the RU 170-*a*) may obtain, from the UE 115-*a*, the cross-link interference report indicating a cross-link interference measurement for at least one receive beam of the set of receive beams.

In some examples, however, lower layer signaling may occur over a relatively short time scale and result in increased processing at the UE 115-*a* (e.g., relative to higher layer signaling). Moreover, processing capabilities of the UE 115-*a* may not be capable of supporting some lower layer signaling requests (e.g., from the network) for cross-link interference measurement and reporting. Therefore, the network entity may configure the UE 115-*a* for cross-link interference measurement and reporting based on one or more processing capabilities of the UE 115-*a*. For example, the network entity (e.g., the CU 160-*a*, the DU 165-*a*, the RU 170-*a* or the like) may obtain control signaling indicating a processing capability of the UE 115-*a* for cross-link interference measurement and reporting. In response to receiving the control signaling indicating the processing capability of the UE 115-*a*, the network entity may output control signaling indicating a configuration of the UE 115-*a* for the cross-link interference measurement and reporting. The network entity may obtain, from the UE 115-*a*, a message indicating a cross-link interference measurement and configured according to the configuration. In some examples, in response to receiving the message indicating the cross-link interference measurement, the network entity (e.g., the CU 160-*a*, the DU 165-*a*, the RU 170-*a* or the like) may perform one or more cross-link interference mitigation techniques. Such techniques may lead to increased reliability of wireless communications between the UEs 115-*a* and the network.

Figure 3A:
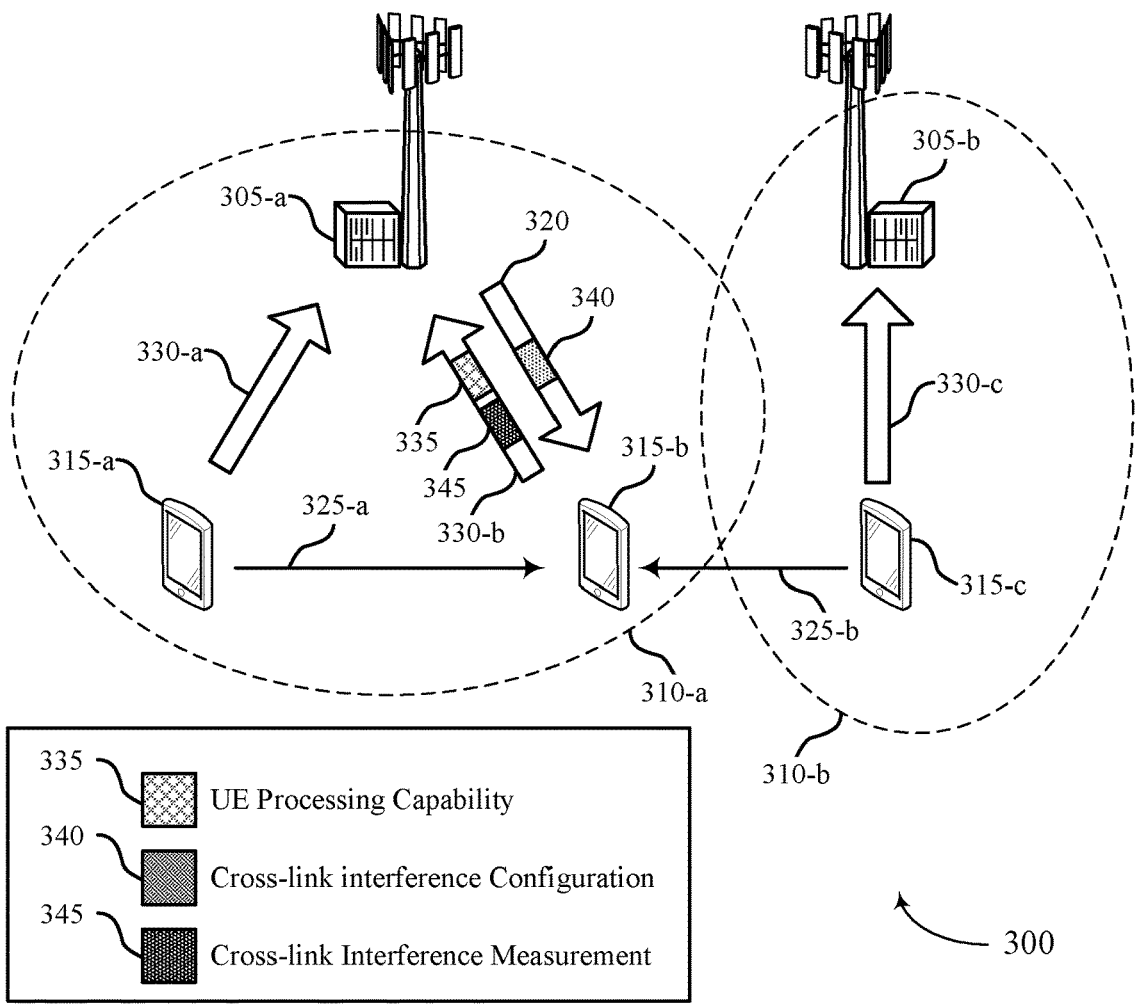
FIG. 3A illustrates an example of a wireless communications system that supports UE processing capability aspects for cross-link interference measurement in accordance with one or more aspects of the present disclosure.

FIG. 3A illustrates an example of a wireless communications system 300 that supports UE processing capability aspects for cross-link interference measurement in accordance with one or more aspects of the present disclosure. In some examples, the wireless communications system 300 may implement or be implemented by one or more aspects of the wireless communications system 100. For example, the wireless communications system 300 may include one or more UEs 315 (e.g., a UE 315-*a*, a UE 315-*b*, and a UE 315-*c*), which may be examples of a UE 115 described with reference to FIG. 1. The wireless communications system 300 may also include one or more network entities 305 (e.g., a network entity 305-*a* and a network entity 305-*b*), which may be examples of one or more network entities 105 (e.g., a CU, a DU, an RU, a base station, an IAB node, a transmission-reception point, or one or more other network nodes) as described with reference to FIG. 1. The network entities 305 and the UEs 315 may communicate within one or more coverage areas 310 (e.g., a coverage area 310-*a*, a coverage area 310-*b*), which may be examples of a coverage area 110 as described with reference to FIG. 1 or FIG. 2. In the example of FIG. 3A, the network entity 305-*a* may serve a cell providing the coverage area 310-*a* and the network entity 305-*b* may serve a cell providing the coverage area 310-*b*. The wireless communications system 300 may include features for improved communications between the UE 315 and the network, among other benefits.

In the example of FIG. 3A, the UEs 315 and the network entities 305 may communicate via one or more communication links. For example, the UE 315-*a* may transmit communications (e.g., uplink communications) to the network entity 305-*a* via a communication link 330-*a* and the UE 315-*c* may transmit communications to the network entity 305-*b* via a communication link 330-*c*. Additionally, or alternatively, the UE 315-*b* may transmit communications to the network entity 305-*a* via a communication link 330-*b* and receive communications from the network entity 305-*a* via a communication link 320. In the example of FIG. 3A, the communication links 330 may be examples of uplinks and the communication link 320 may be an example of a downlink. The communication links 330 and the communication link 320 may each be examples of a communication link 125 as described with reference to FIG. 1.

In some examples, neighboring communication devices (e.g., at least two of the UE 315-a, the UE 315-b, and the UE 315-c) may perform half-duplex TDD communications (or full-duplex communications) concurrently, such that downlink communications received by a first communication device may overlap in time with uplink communications transmitted by a second communication device (e.g., a neighboring communication device). For example, the network entity 305-a and the network entity 305-b may perform full-duplex communications concurrently, such that uplink communications transmitted by the UE 315-c to the network entity 305-b (e.g., the serving cell of the UE 315-c) may overlap in time with downlink communications received by the UE 315-b from the network entity 305-a (e.g., the serving cell of the UE 315-b).

While the UE 315-b and the UE 315-c may communicate over different cells, the UE 315-b and the UE 315-c may be spatially located, such that the uplink communications transmitted by the UE 315-c may interfere with the downlink communications received at the UE 315-b. For example, the uplink communications transmitted by the UE 315-c may lead to cross-link interference 325-b (e.g., inter-cell cross-link interference) at the UE 315-b. Additionally, or alternatively, the network entity 305-a may perform full-duplex communications, such that uplink communications transmitted by the UE 315-a to the network entity 305-a may overlap in time with downlink communications received by the UE 315-b from the network entity 305-a. In such an example, the uplink communications transmitted by the UE 315-a may interfere with the downlink communications received at the UE 315-b. That is, the uplink communications transmitted by the UE 315-a may lead to cross-link interference 325-a (e.g., intra-cell cross-link interference) at the UE 315-b. In some examples, the cross-link interference 325-a and the cross-link interference 325-b may degrade downlink communications received at the UE 315-b.

To mitigate (e.g., control) cross-link interference (e.g., in a dynamic TDD scheme), the network may employ a cross-link interference measurement and reporting scheme, in which the network may enable the UE 315-b (e.g., a downlink UE) to measure cross-link interference from neighboring UEs 315 and report the measured interference to the network. For example, the network may configure the UE 315-b to measure the cross-link interference 325-a (e.g., from the UE 315-a) and the cross-link interference 325-b (e.g., from the UE 315-c) and report the cross-link interference measurements to the network. In some examples of cross-link interference reporting, the network may configure the UE 315-a (e.g., the uplink UE) to transmit reference signals (e.g., sounding reference signals (SRSs)) to be received and measured by the UE 315-b (e.g., a peer, neighbor, or sidelink UE, which may be the downlink UE from the network entity 305-a). For example, the UE 315-a may transmit SRSs, while the UE 315-b may receive and measure the strength of the resulting interference. That is, the UE 315-b may measure the interference resulting from concurrent transmission of SRSs by the UE 315-a and downlink transmissions by the network entity 305-a. In some examples, the UE 315-b (e.g., the downlink UE) may report the cross-link interference measurements as (e.g., in terms of) received power measurements, such as a power measurement (e.g., a reference signal received power (RSRP) measurement, such as synchronization signal reference signal received power (SS-RSRP) measurements) or a signal strength measurement (e.g., a received signal strength indicator (CLI-RSSI) measurement, such as cross-link interference received signal strength indicator (CLI-RSSI) measurements).

In some examples, the network (e.g., the network entity 305-a) may schedule communications for the UE 315-b (or the UE 315-a) based on the cross-link inference report. For example, to reduce the effects of cross-link interference 325-a, the network may schedule the UE 315-a to transmit uplink communications over time and frequency resources different from the time and frequency resources allocated for the UE 315-b to receive downlink communications, thereby reducing (e.g., avoiding) cross-link interference (e.g., intra-cell cross-link interference) at the UE 315-b. Additionally, or alternatively, the network entity 305-a and the network entity 305-b may coordinate scheduling of the UE 315-b and the UE 315-c, such that the resources scheduled for downlink receptions by the UE 315-b may be orthogonal to the resources scheduled for uplink transmissions by the UE 315-c, thereby reducing (e.g., avoiding) the cross-link interference (e.g., the inter-cell cross-link interference) at the UE 315-b. For scenarios, use cases, or examples in which a full-duplex network entity serves downlink UEs and uplink UEs concurrently, the downlink UE may have an increased likelihood of experiencing intra-cell cross-link interference (e.g., relative to inter-cell cross-link interference). For example, the UE 315-b may have an increased likelihood of experiencing intra-cell cross-link interference from the UE 315-a relative to the UE 315-b.

In some examples, the network may configure the UE 315-b to measure and report cross-link interference via higher layer (e.g., L3, RRC layer) signaling. In some examples, however, the UEs 315 may move throughout the coverage area 310-a or the coverage area 310-b (or both), which may lead to dynamic changes in cross-link interference that may not be captured by higher layer cross-link interference reporting. That is, a latency associated with higher layer cross-link interference reporting may not be suitable for scenarios in which cross-link interference changes dynamically.

In some examples of higher layer cross-link interference reporting, the network may configure the UE 315-b (e.g., the downlink UE) to report cross-link interference measurements periodically (or based on one or more predefined triggering conditions). In such an example, the network (e.g., a DU of the network) may obtain (e.g., collect) a cross-link interference report from the UE 315-b, which may then be communicated (e.g., transmitted, signaled, output) to a CU of the network. In some examples, communicating information from the UE 315-b, such as the cross-link interference report, between the CU and the DU may lead to increased latency (e.g., additional latency) relative to lower layer (e.g., L1, PHY layer, L2, MAC layer) signaling, in which information may be obtained (e.g., collected) from the UE 315-b by the DU. Additionally, or alternatively, as part of higher layer cross-link interference reporting, the UE 315-b may be configured to filter (e.g., perform higher layer filtering of) the cross-link interference measurements. In some examples, however, such filtering may not be suitable for beam switching (e.g., relatively fast beam switching) in response to variations in the measured cross-link interference (e.g., over a time duration). For example, configuration (e.g., reconfiguration) of a beam for wireless communications with the network via higher layer signaling (e.g., via an RRC configuration) may be inflexible and associated with a latency that may not be suitable for scenarios in which channel conditions change dynamically, for example due to fluctuating cross-link interference.

In some examples, the network may employ a lower-layer cross-link interference framework (e.g., an enhanced cross-link interference framework) to increase the performance of cross-link interference mitigation (e.g., handling, control) within the wireless communications system 300. For example, the network may configure the UE 315-b to perform cross-link interference measurement and reporting via lower layer signaling. In some examples, lower layer cross-link interference reporting may capture cross-link interference (e.g., current cross-link interference) experienced by the UE 315-b. Additionally, or alternatively, lower layer cross-link interference reporting may enable the network to request cross-link interference information (e.g., a cross-link interference report) for beam selection with reduced latency (e.g., a relatively low latency), for example based on traffic conditions.

In some examples of lower layer cross-link interference reporting, the network may configure the UE 315-b with one or more resources for performing cross-link interference measurements on reference signals (e.g., SRSs) transmitted by another UE 315 (e.g., the UE 315-a). Additionally, or alternatively, the network may configure the UE 315-b with one or more resources for indicating the cross-link interference measurements to the network (e.g., via a cross-link interference report). The network may configure the UE 315-b to measure cross-link interference periodically, semi-persistently, or aperiodically. For example, the network may configure the UE 315-b for cross-link interference reporting with periodic resources, semi-persistent resources, or aperiodic resources (e.g., dynamic resources). Additionally, or alternatively, the network may configure the UE 315-b to transmit a cross-link interference report periodically, semi-persistently, or aperiodically. For example, the network may configure the UE 315-b for cross-link interference with a periodic report, a semi-persistent report, or an aperiodic report (i.e., with one or more report types). In some examples, the network may configure the UE 315-b with a combination of cross-link interference resources (e.g., periodic resources, semi-persistent resources, or aperiodic resources) and a report type (e.g., a periodic report, a semi-persistent report, or an aperiodic report) in accordance with the following Table 1:

TABLE 1

|  | Periodic Report | Semi-persistent Report | Aperiodic Report |
| --- | --- | --- | --- |
| Periodic Resources | Yes | Yes | Yes |
| Semi-persistent Resources | No | Yes | Yes |
| Aperiodic Resources | No | No | Yes |

In accordance with Table 1, "Yes" may indicate that the corresponding combination of resources and report type may be suitable (e.g., applicable) for cross-link interference reporting. For example, in accordance with Table 1, the network may configure the UE 315-b for cross-link interference reporting with periodic resources a periodic report type. Additionally, or alternatively, "No" may indicate that the corresponding combination of resources and report type may not be suitable (e.g., may not be applicable) for cross-link interference reporting. For example, in accordance with Table 1, the network may refrain from configuring the UE 315-b for cross-link interference reporting with semi-persistent resources and a periodic report type.

In some examples, the network may configure the UE 315-b with resources for performing the cross-link interference measurements (e.g., cross-link interference resources) via control signaling. For example, the UE 315-b may receive control signaling indicating a set of cross-link interference resources (e.g., a set of cross-link interference measurement occasions). The set of cross-link interference resources may include SRS resources (e.g., L1 SRS resources), RSSI resources (e.g., L1 RSSI resources), or both. In some examples, the set of cross-link interference resources may be associated with a set of receive beams (e.g., transmission configuration indicator (TCI) states, beam configurations, beam configuration states, or just beams). For example, each cross-link interference resource (e.g., of the configured set of cross-link interference resource) may be associated with a TCI state (e.g., which may also be referred to herein as beams, receive beams (at UE for downlink or sidelink), transmit beams (at a UE for uplink or sidelink), beam configurations, or beam configuration states or modes) to be used by the UE 315-b for determining a receive beam for performing the cross-link interference measurements. In some examples, the UE 315-b may determine a receive beam for performing the cross-link interference measurements over one or more of the configured cross-link interference resources based on a quasi co-location relationship of the associated TCI state.

In some examples, the network may indicate a TCI state corresponding to a cross-link interference resource (or multiple cross-link interference resources) via control signaling. For example, the network may configure a TCI state corresponding to one or more periodic cross-link interference resources via RRC signaling (e.g., an RRC configuration). Additionally, or alternatively, the network may configure a TCI state corresponding to one or more semi-persistent cross-link interference resources via a MAC-CE. For example, the network may configure the UE 315-b with semi-persistent cross-link interference resources via control signaling (e.g., via the RRC configuration) and the TCI state associated with each of the configured cross-link interference resources may be updated (e.g., dynamically updated) via a MAC-CE, such as a MAC-CE that indicates for one or more of the cross-link interference resources or one or more cross-link interference resource sets (e.g., lists) to be activated or deactivated. Additionally, or alternatively, the network may configure a TCI state corresponding to one or more semi-persistent cross-link interference resources via a downlink control information (DCI) message or signaling. For example, the network may configure the UE 315-b with cross-link interference resources (or cross-link interference resources sets) and the corresponding TCI states via control signaling (e.g., via the RRC configuration). In some examples, each cross-link interference resource (or resource set) may be configured with a trigger state that may be indicated (e.g., dynamically indicated, updated) via the DCI.

In some examples, the UE 315-b may not be capable of switching to a beam associated with a TCI state of a configured resource. In such an example, the UE 315-b may determine a default TCI state (e.g., a default beam) for performing the cross-link interference measurement based on one or more rules (e.g., one or more rules configured by the network). For example, the network may transmit an indication (e.g., a DCI) to configure (e.g., aperiodically) the UE 315-b to perform cross-link interference reporting on reference signals transmitted by another UE 315. In such an example, if a scheduling offset between the resources in which the DCI is received by the UE 315-b and the resources over which the UE 315-b is configured to perform the cross-link interference measurements fails to satisfy a threshold (e.g., fails to exceed a threshold, is relatively shorter than a threshold), the UE 315-*b* may determine to use a default TCI state (e.g., based on one or more rules) for performing the cross-link interference measurements.

In some examples, by configuring the UE 315-*b* for cross-link interference measurement and reporting via lower layer signaling, the network may increase the flexibility and decreasing the latency of cross-link interference reporting (e.g., relative to higher layer cross-link interference reporting). In some examples, however, lower layer signaling may occur over a relatively short time scale and result in increased processing at the UE (e.g., relative to higher layer signaling). Moreover, processing capabilities of the UE may not be capable of supporting some lower layer signaling requests (e.g., from the network) for cross-link interference measurement and reporting. Therefore, to improve the reliability of lower layer cross-link interference measurement and reporting by the UE 315-*b*, the network may consider processing capabilities of the UE 315-*b* (e.g., related to cross-link interference measurement and reporting).

Some UE processing capability aspects for cross-link interference measurement, as described herein, may provide one or more enhancements to cross-link interference measurement and reporting, thereby improving the utilization of processing capabilities at the UE 315-*b*. For example, the UE 315-*b* may transmit control signaling indicating a processing capability of the UE 315-*b* (e.g., a UE processing capability 335) for cross-link interference measurement and reporting. In some examples, the UE processing capability 335 may indicate a UE capability related to (e.g., on) a quantity of measurable reference signals, per time duration, by the UE 315-*b*. For example, the UE processing capability 335 may indicate a quantity (e.g., a maximum quantity or an otherwise suitable quantity) of measured reference signals per slot that may include cross-link interference resources (e.g., resource for performing cross-link interference measurements on reference signals transmitted by another UE 315). In some examples, the cross-link interference resources may include L1 cross-link interference resources, L3 cross-link interference resources, or both. Additionally, or alternatively, the UE processing capability 335 may indicate a consumed processing power for cross-link interference resources (e.g., L1 cross-link interference resource). That is, the UE processing capability 335 may indicate an amount of processing power consumed by the UE 315-*b* (to measure and report cross-link interference over cross-link interference resources). For example, the UE 315-*b* may quantify (e.g., the central processing unit of the UE 315-*b* may be extended to quantify) an amount of processing power consumed per cross-link interference resource (e.g., L1 cross-link interference resource) for performing cross-link interference measurements (or cross-link interference reporting). In some examples, the network may schedule cross-link interference resources for the UE 315-*b*, such that the amount of processing power consumed by the UE 315-*b* for cross-link interference measurement and reporting may not exceed the amount indicated via the UE processing capability 335.

Additionally, or alternatively, the UE processing capability 335 may indicate a time duration for processing (e.g., by the UE 315-*b*) associated with cross-link interference measurement and reporting (e.g., a central processing unit occupied duration, an occupied duration). In some examples, the occupied duration may occur from (e.g., may be defined from) a time in which a cross-link interference measurement may be performed by the UE 315-*b* to a time in which a cross-link interference report (e.g., indicating the cross-link interference measurement) may be transmitted by the UE 315-*b* to the network. For example, the occupied duration may occur from a cross-link interference resource scheduled for the UE 315-*b* (e.g., an end of periodic or semi-persistent cross-link interference resource) to a resource used by the UE 315-*b* for transmitting a cross-link interference report. Additionally, or alternatively, the occupied duration may occur from a time in which the UE 315-*b* may receive control signaling indicating for the UE 315-*b* to perform cross-link interference measurement and reporting to the time in which the cross-link interference report may be transmitted to the network. For example, the occupied duration may occur from a time in which a DCI (e.g., an end of a DCI) triggering the UE 315-*b* to perform a cross-link interference measurement over a cross-link interference resource (e.g., triggering an aperiodic cross-link interference resource) is received by the UE 315-*b* to a time in which the UE 315-*b* may transmit the cross-link interference report. In some examples, the UE processing capability 335 may be indicated to the network with other UE radio access capabilities (e.g., parameters indicated to the network via UE capability signaling), such as UE capabilities associated with resources for beam management, pathloss measurement, beam failure detection, radio link monitoring, and beam identification (e.g., beam identification across radio frequencies), among other examples.

In some examples, in response to the control signaling capability indicating the processing capability of the UE 315-*b*, the UE 315-*b* may receive control signaling from the network entity 305-*a* indicating a configuration of the UE 315-*b* for the cross-link interference measurement and reporting (e.g., a cross-link interference configuration 340). The UE 315-*b* may transmit, to the network entity 305-*a*, a message indicating a cross-link interference measurement 345 generated by the UE 315-*b* according to the cross-link interference configuration 340.

In some examples, the UE 315-*b* may determine to transmit a cross-link interference report (e.g., indicating the cross-link interference measurement 345) based on one or more rules (e.g., an event). For example, the UE 315-*b* may transmit an event triggered report if one or more cross-link interference measurements 345 satisfy a threshold. Additionally, or alternatively, the network may configure the UE 315-*b* with an activation mechanism for semi-persistent cross-link interference reporting. For example, the network may configure (e.g., via RRC signaling) the UE 315 with semi-persistent resources (e.g., one or more lists of semi-persistent resources) for reporting one or more cross-link interference measurements 345. In such an example, the network may activate (or deactivate) the configured resources via a MAC-CE.

Figure 3B:
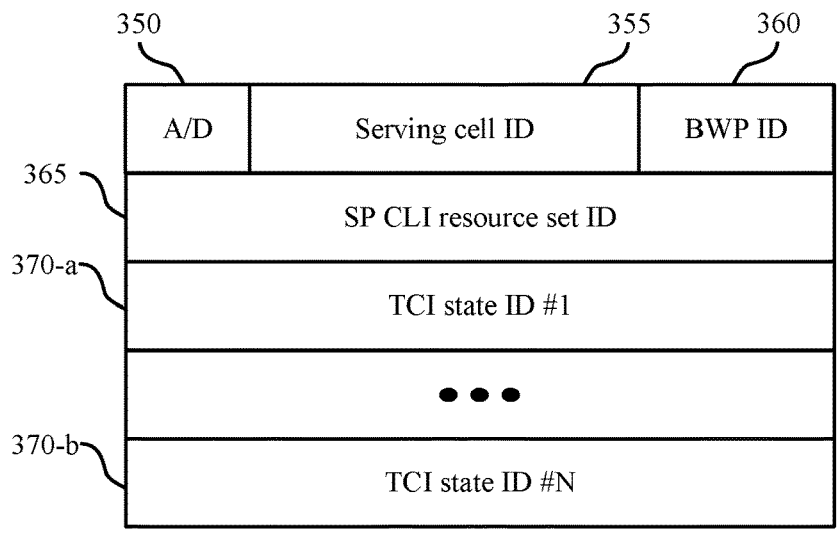
FIG. 3B illustrates an example of a media access control control element (MAC-CE) that supports UE processing capability aspects for cross-link interference measurement in accordance with one or more aspects of the present disclosure.

FIG. 3B illustrates an example of a MAC-CE 301 that supports UE processing capability aspects for cross-link interference measurement in accordance with one or more aspects of the present disclosure. In the example of FIG. 3B, the MAC-CE 301 may be communicated between one or more of the UEs 315 and one or more of the network entities 305, as described with reference to FIG. 3A. For example, the network entity 305-*a* may activate (or deactivate) resources configured for cross-link interference reporting via the MAC-CE 301. In some examples, by activating resources (e.g., semi-persistent resources) via the MAC-CE 301, the network may trigger the UE 315-*b* to transmit a cross-link interference report (e.g., indicating the cross-link interference measurement 345).

In some examples, the MAC-CE 301 may include an activation or deactivation (A/D) field (e.g., an A/D field 350) that may indicate, to the UE 315-*b*, whether to activate or deactivate semi-persistent resources (e.g., semi-persistent cross-link interference resources) configured for the UE 315-*b* (e.g., via RRC signaling). In some examples, the A/D field 350 may be set to 1 to indicate activation and may be set to 0 (e.g., or another value different from 1) to indicate deactivation. Additionally, or alternatively, the MAC-CE 301 may include a serving cell identifier field (e.g., a serving cell ID field 355), that may indicate an identifier of a serving cell for which the MAC-CE 301 may apply. In some examples, a length of the serving cell ID field 355 may be five bits. Additionally, or alternatively, the MAC-CE 301 may include a BWP ID field 360, that may indicate a downlink field for which the MAC-CE 301 may apply. For example, the BWP ID field 360 may indicate a bandwidth part to be applied as a codepoint (e.g., of a DCI bandwidth part indicator field) to identify a bandwidth part in which the indicated resources (e.g., the frequency resources) may be located. In some examples, the BWP ID field 360 may be two bits.

Additionally, or alternatively, the MAC-CE 301 may include a semi-persistent cross-link interference resource set ID field, (e.g., a SP CLI RS resource set ID field 365) that may include an index of a set of cross-link interference resources (e.g., a cross-link interference resource set) including semi-persistent cross-link interference resources that may be activated or deactivated by the MAC-CE 301 (e.g., based on a value of the A/D field 350). In some examples, the cross-link interference resource set may be a non-zero power cross-link interference resource set including semi-persistent non-zero power cross-link interference resources. In some examples, each cross-link interference resource set (e.g., corresponding to the index provided by an SP CLI resource set ID field 365) may be configured at the UE 315-*b* via a higher layer parameter (e.g., via a NZP-CLI-RS-ResourceSet information element (IE)). For example, the parameter may indicate a set of resources (e.g., non-zero-power cross-link interference resources), respective identifiers of the resources, and one or more set-specific parameters. In some examples, the semi-persistent cross-link interference resource set identifier field, (e.g., the SP CLI-RS resource set ID field 365) may include one or more TCI state ID fields 370 (e.g., a TCI state ID field 370-*a* and a TCI state ID field 370-*b*). Each TCI state ID field 370 may include an identifier that may be used as a quasi co-location source for a resource within the cross-link interference resource set (e.g., corresponding to the index provided by the SP CLI resource set ID field 365). For example, the TCI state ID field 370-*a* may indicate a first TCI state for a first resource of the cross-link interference resource set and the TCI state ID field 370-*b* may indicate a first TCI state for an N-th resource of the cross-link interference resource set. It is to be understood that the names of IEs and fields described herein may change based on implementation of one or multiple devices (e.g., the UEs 315, the network entities 305, or both), and the examples described herein should not be considered limiting to the scope covered by the claims or the disclosure.

Figure 4:
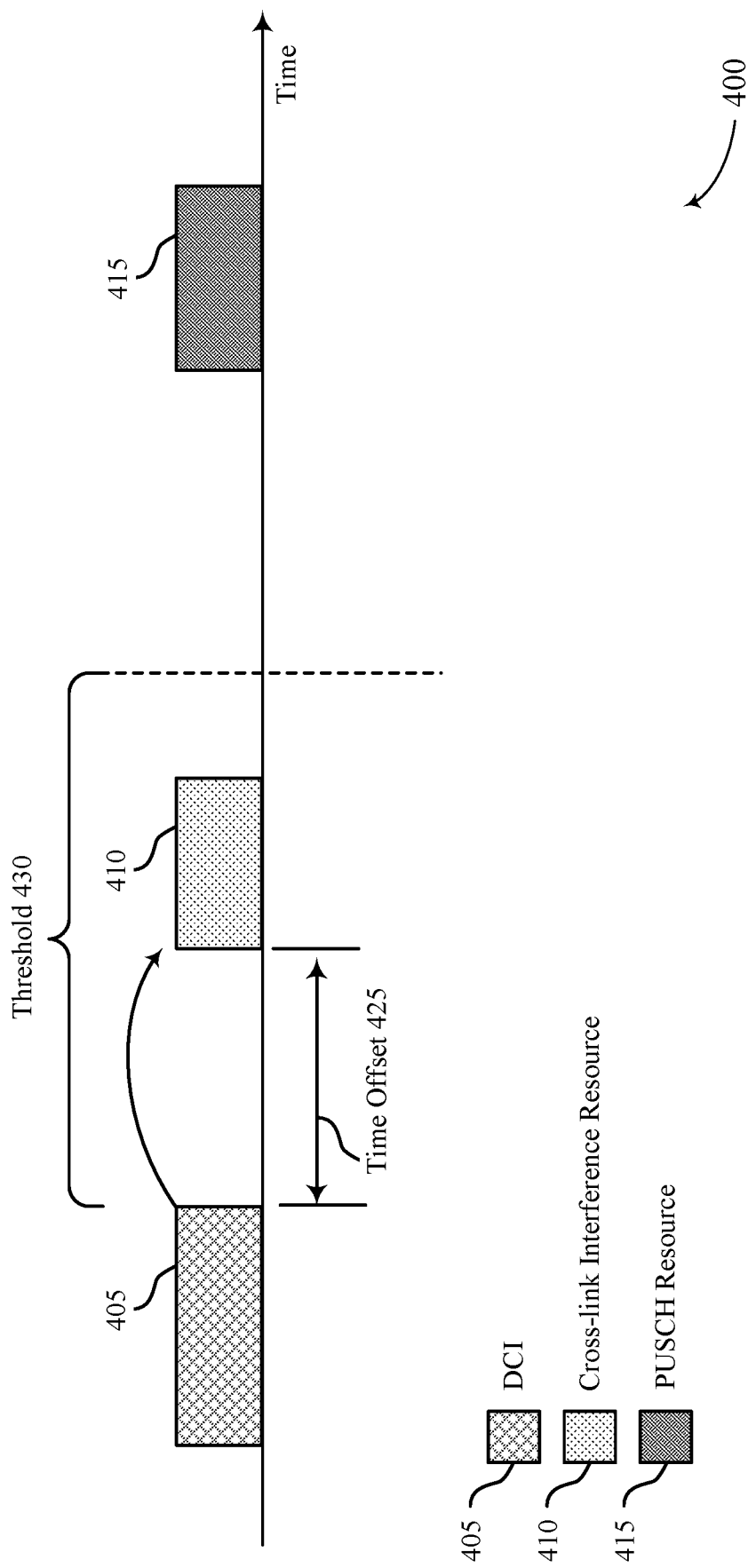
FIG. 4 through 7 each illustrate an example of a timing diagram that supports UE processing capability aspects for cross-link interference measurement in accordance with one or more aspects of the present disclosure.

FIG. 4 illustrates an example of a timing diagram 400 that supports UE processing capability aspects for cross-link interference measurement in accordance with one or more aspects of the present disclosure. In some examples, the timing diagram 400 may implement or be implemented by one or more aspects of the wireless communications system 100 and the wireless communications system 300. For example, the timing diagram 400 may be implemented by a UE and a network entity, which may be examples of the corresponding devices as described with reference to FIGS. 1, 2, and 3A. In the example of FIG. 4, the network entity may be an example of a CU 160, a DU 165, or an RU 170, a base station 140, an IAB node 104, a transmission-reception point, or one or more other network nodes as described with reference to FIGS. 1, 2, and 3A. The timing diagram 400 may include features for improved communications between the UE and the network, among other benefits.

As illustrated in the example of FIG. 4, the network (e.g., one or more network entities) may configure a communication device (e.g., the UE) to perform cross-link interference measurement and reporting via lower layer (e.g., L1, PHY layer, L2, MAC layer) signaling. In some examples, the network may configure the UE to perform cross-link interference measurement and reporting aperiodically, such as via dynamic signaling (e.g., a DCI). For example, the network may transmit a DCI 405 indicating (e.g., triggering) for the UE to measure and report cross-link interference. In some examples, the DCI 405 may indicate for the UE to measure and report cross-link interference via a field included in the DCI 405, such as a CLI-trigger state field. For example, the CLI-trigger state field may indicate an index of a trigger state for cross-link interference resources that may be configured (e.g., preconfigured) for the UE (e.g., via RRC signaling). In some examples, each trigger state may indicate one or more cross-link interference resources (e.g., a cross-link interference resource 410) over which the UE may perform the cross-link interference measurements. Additionally, or alternatively, the CLI-trigger state field may indicate a type of resource (e.g., periodic resources, semi-persistent resources, or aperiodic resources) that may be used by the UE for reporting the cross-link interference measurements. For example, the network may indicate one or more frequency domain resources, such as physical uplink shared channel (PUSCH) resources. In some examples, the indicated PUSCH resources (e.g., a PUSCH resource 415) may be periodic, semi-persistent, or aperiodic. In some examples, multiple trigger states for performing the cross-link interference measurement may be configured at the UE (e.g., via the RRC signaling) and the DCI 405 may indicate an index (e.g., via the CLI-trigger state field) of a trigger state to be used by the UE, thereby activating a cross-link interference report.

In some examples, the network may indicate a time offset 425 between the DCI 405 and the cross-link interference resource 410. Additionally, or alternatively, the network may indicate another time offset (not shown) between the cross-link interference resource 410 and the PUSCH resource 415 (or other resources over which the cross-link interference may be reported to the network). In some examples, the cross-link interference resources 410 may be associated with a TCI state. For example, the network may indicate a TCI state corresponding to each cross-link interference resource 410 configured for the UE. In such an example, the UE may use the TCI state (e.g., a quasi co-location relationship associated with the TCI state) to determine (e.g., identify, select) a beam for performing the cross-link interference measurements over the corresponding cross-link interference resource 410. For example, in response to receiving an indication to perform cross-link interference measurements over the cross-link interference resource 410 (e.g., via the DCI 405), the UE may switch to a beam (e.g., a receive beam) associated with the TCI state configured for the cross-link interference resource 410 (e.g., to performing the cross-link interference measurements).

In some examples, however, the UE may not be capable of switching to the beam associated with the TCI state of the configured resource (e.g., the cross-link interference resource 410). For example, if the time offset 425 between the DCI 405 and the cross-link interference resource 410 (e.g., the triggered aperiodic cross-link interference resource) fails to satisfy (e.g., fails to exceed) an aperiodic cross-link interference beam switch latency threshold (e.g., a threshold 430), the UE may not be capable of switching to the beam associated with the TCI state of the cross-link interference resource 410. In some examples, the threshold 430 may be based on one or more capabilities of the UE (e.g., a UE capability). For example, the UE may transmit a message, such as UE capability signaling, to the network indicating a threshold offset (e.g., the threshold 430) for an offset between the DCI 405 and an occasion (e.g., the cross-link interference resource 410) indicated by the DCI 405. Additionally, or alternatively, the threshold may have an increased latency, for example if the DCI 405 (e.g., the DCI triggering the cross-link interference measurement and reporting) is associated with a sub-carrier spacing difference from the cross-link interference resource 410 (e.g., the aperiodic cross-link interference resource triggered by the DCI 405).

In some examples, if the time offset 425 fails to satisfy (e.g., fails to exceed) the threshold 430, the UE may determine a default receive beam (e.g., a default TCI state) for performing the cross-link interference measurement based on one or more rules (e.g., configured by the network). In some examples, a rule (e.g., an aperiodic cross-link interference default beam rule) for determining the default receive beam may be a same rule as may be used for determining a default beam for performing channel state information measurements (e.g., for performing channel state information measurements over aperiodic channel state information reference signal resources). In some examples, the UE may be configured to operate in a single transmission-reception point mode. In such examples, if the aperiodic cross-link interference resource (e.g., the cross-link interference resource 410) overlaps (e.g., in time, frequency, or both in time and in frequency) with a downlink transmission scheduled for the UE (e.g., a known downlink signal) the UE may determine a receive beam based on a quasi co-location (QCL) relationship (e.g., assumption) of the scheduled downlink transmission. Additionally, or alternatively, the UE may determine a receive beam based on a quasi co-location relationship (e.g., assumption) associated with a control resource set, such as a control resource set associated with a relatively lowest identifier in a relatively last monitored slot.

In some examples, the UE may be configured to operate in a multiple transmission-reception point (mTRP) mode (e.g., a single DCI multiple transmission-reception point mode (sDCI mTRP) or a multiple DCI multiple transmission-reception point mode (mDCI mTRP)), a single frequency network (SFN) mode (e.g., associated with a single frequency network control resource set (CORESET)), or a cross-carrier scheduling mode (e.g., associated with cross-component carrier (cross-CC) scheduling). In some examples, the UE may determine a receive beam based on a same rule as may be used for determining a default beam for performing channel state information measurements (e.g., for performing channel state information measurements over aperiodic channel state information reference signal resources).

In some examples, if the UE is configured to operate in a single DCI multiple transmission-reception point mode, the UE may determine a receive beam based on a TCI state (e.g., a quasi co-location relationship associated with the TCI state) identified by a codepoint (e.g., a TCI state codepoint associated with a relatively lowest identifier) including multiple (e.g., two) TCI states. That is, for single DCI multiple transmission-reception point operations, the UE may determine a receive beam based on a TCI codepoint having a relatively lowest identifier value and that identifies multiple TCI states corresponding to the multiple transmission-reception points.

Additionally, or alternatively, if the UE is configured to operate in a multiple DCI multiple transmission-reception point mode, the UE may determine a receive beam based on a TCI state (e.g., a quasi co-location relationship associated with the TCI state) corresponding to a control resource set (e.g., a relatively latest monitored control resource set) for each of multiple control resource set pools (e.g., sets or groups of control resource sets) configured for the UE (e.g., via a CORESETpool IE). That is, for multiple DCI multiple transmission-reception point operations, the UE may determine a receive beam based on a TCI state associated with a recently (e.g., a most recently) monitored control resource set for each control resource set pool configured at the UE.

Additionally, or alternatively, if the UE is configured to operate in a single frequency network mode (e.g., associated with a single frequency network control resource set) the UE may determine a receive beam based on a TCI state (e.g., a quasi co-location relationship associated with the TCI state) identified by a codepoint, such as a single frequency network TCI state codepoint associated with a relatively lowest identifier. Additionally, or alternatively, if the UE is configured to operate in a cross-carrier scheduling mode, the UE may determine a receive beam based on a TCI state (e.g., a quasi co-location relationship associated with the TCI state) identified by a codepoint, such as a TCI state codepoint associated with a relatively lowest identifier. That is, for single frequency network operations or cross-carrier scheduling operations (or both), the UE may determine a receive beam based on a TCI codepoint having a relatively lowest identifier value. In some examples, by configuring the UE to perform cross-link interference measurement and reporting aperiodically via lower layer signaling, the network may provide one or more enhancements to techniques for cross-link interference measurement and reporting, among other benefits.

Figure 5:
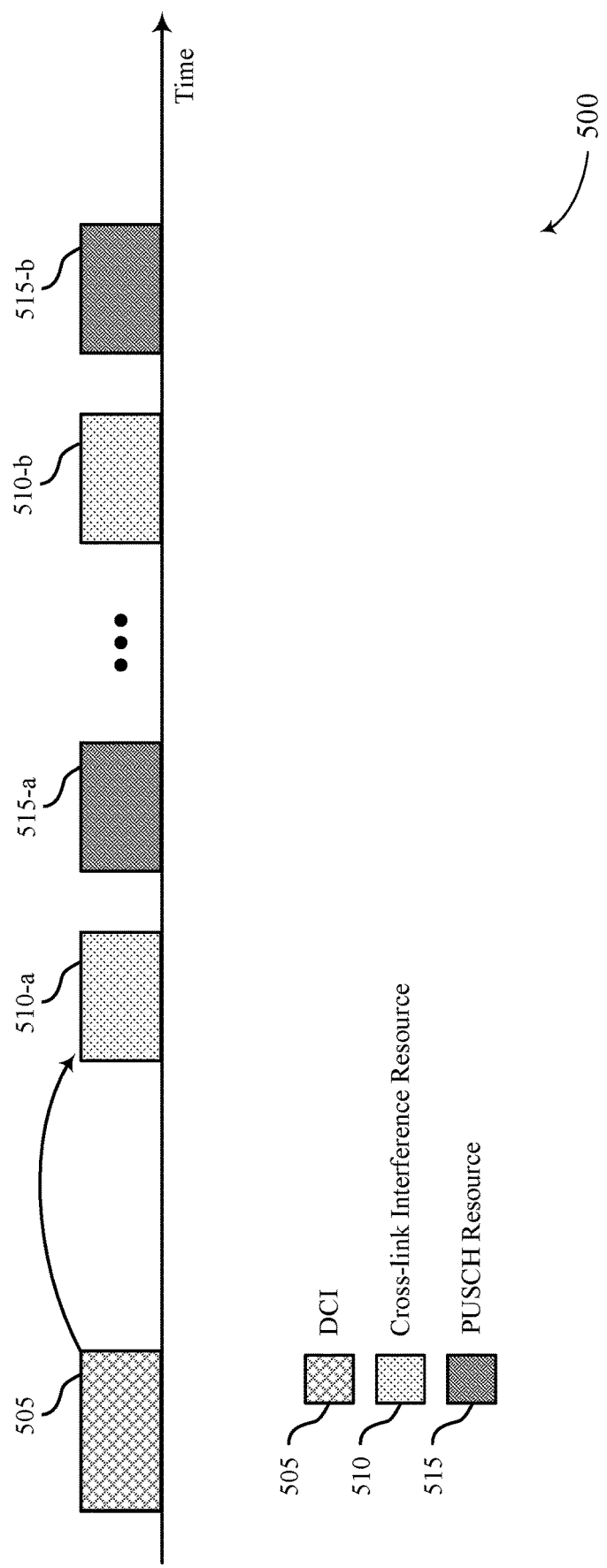

FIG. 5 illustrates an example of a timing diagram 500 that supports UE processing capability aspects for cross-link interference measurement in accordance with one or more aspects of the present disclosure. In some examples, the timing diagram 500 may implement or be implemented by one or more aspects of the wireless communications system 100 and the wireless communications system 300. For example, the timing diagram 500 may be implemented by a UE and a network entity, which may be examples of the corresponding devices as described with reference to FIGS. 1, 2, and 3A. In the example of FIG. 5, the network entity may be an example of the network entity may be an example of a CU 160, a DU 165, or an RU 170, a base station 140, an IAB node 104, a transmission-reception point, or one or more other network nodes as described with reference to FIGS. 1, 2, and 3A. The timing diagram 500 may include features for improved communications between the UE and the network, among other benefits.

In some examples, a network (e.g., one or more network entities) may configure a communication device (e.g., a UE)

to perform cross-link interference measurement and reporting semi-persistently. In such examples, the network may configure the UE to transmit a cross-link interference report (e.g., a semi-persistent cross-link interference report) on a physical uplink channel, such as a physical uplink control channel (PUCCH) or a PUSCH. For example, as illustrated in the example of FIG. 5, the network may indicate (e.g., trigger) for the UE to perform semi-persistent cross-link interference reporting over one or more PUSCH resources 515 (e.g., a PUSCH resource 515-*a* or a PUSCH resource 515-*b*) via a DCI 505. That is, the DCI 505 may trigger (e.g., activate) semi-persistent cross-link interference reporting for the UE. In some examples, the cross-link interference report (e.g., the semi-persistent cross-link interference report) may be activated by a DCI which may be scrambled by a radio network temporary identifier (RNTI) configured at the UE for cross-link interference reporting (e.g., indicated to the UE via an SP-CLI-RNTI IE). For example, a semi-persistent cross-link interference request field (e.g., identified by particular field values) may be included in the DCI 505 (e.g., the activation DCI) and the DCI 505 may be scrambled by the RNTI configured at the UE for cross-link interference reporting. In such an example, the semi-persistent cross-link interference request field may activate one or more semi-persistent cross-link interference trigger states of multiple semi-persistent cross-link interference trigger states that may be configured for the UE. For example, the semi-persistent cross-link interference request field may activate one or more semi-persistent cross-link interference trigger states associated with (e.g., linked to) a parameter (e.g., a higher layer parameter of a CLI-ReportConfig IE) that may indicate (e.g., specify) corresponding semi-persistent cross-link interference resources (e.g., a cross-link interference resource 510-*a* and a cross-link interference resource 510-*b*) and a report configuration (e.g., a cross-link interference report configuration).

Additionally, or alternatively, the network may activate (e.g., trigger) semi-persistent cross-link interference reporting over one or more the PUSCH resources 515 (e.g., the PUSCH resource 515-*a* or the PUSCH resource 515-*b*) by configure the UE with a semi-persistent cross-link interference trigger state of a same list as may be used to indicate semi-persistent channel state information trigger state. That is, the network may use common signaling to trigger the UE for semi-persistent cross-link interference reporting and channel state information reporting. In such an example, the DCI 505 (e.g., the triggering DCI) may be scrambled using a same RNTI as may be used for scrambling a DCI used to trigger channel state information reporting.

In some examples, if the DCI 505 (e.g., the triggering DCI) is scrambled using a same RNTI as may be used for scrambling the DCI that triggers channel state information reporting, the semi-persistent cross-link interference trigger state may be indicated via a same field as may be used to indicate a semi-persistent channel state information trigger state. For example, a common trigger state field (e.g., corresponding to a same list of trigger states configured for the UE) may be used to indicate both the semi-persistent cross-link interference trigger state and a semi-persistent channel state information trigger state. In other examples, the trigger state field used to indicate the semi-persistent cross-link interference trigger state may be different from the trigger state field used to indicate the semi-persistent channel state information trigger state. For example, the DCI 505 may include a semi-persistent cross-link interference trigger state field and a semi-persistent channel state information trigger state field (e.g., that may correspond to the same list of trigger states configured at the UE). Additionally, or alternatively, if the DCI 505 (e.g., the triggering DCI) is scrambled using a same RNTI as may be used for scrambling the DCI that triggers channel state information reporting, the semi-persistent cross-link interference trigger state may be indicated via a trigger state field different from a trigger state field used to indicate a semi-persistent channel state information trigger state. In some examples, by configuring the UE to perform cross-link interference measurement and reporting semi-persistently via lower layer signaling, the network may provide one or more enhancements to techniques for cross-link interference measurement and reporting, among other benefits.

Figure 6:
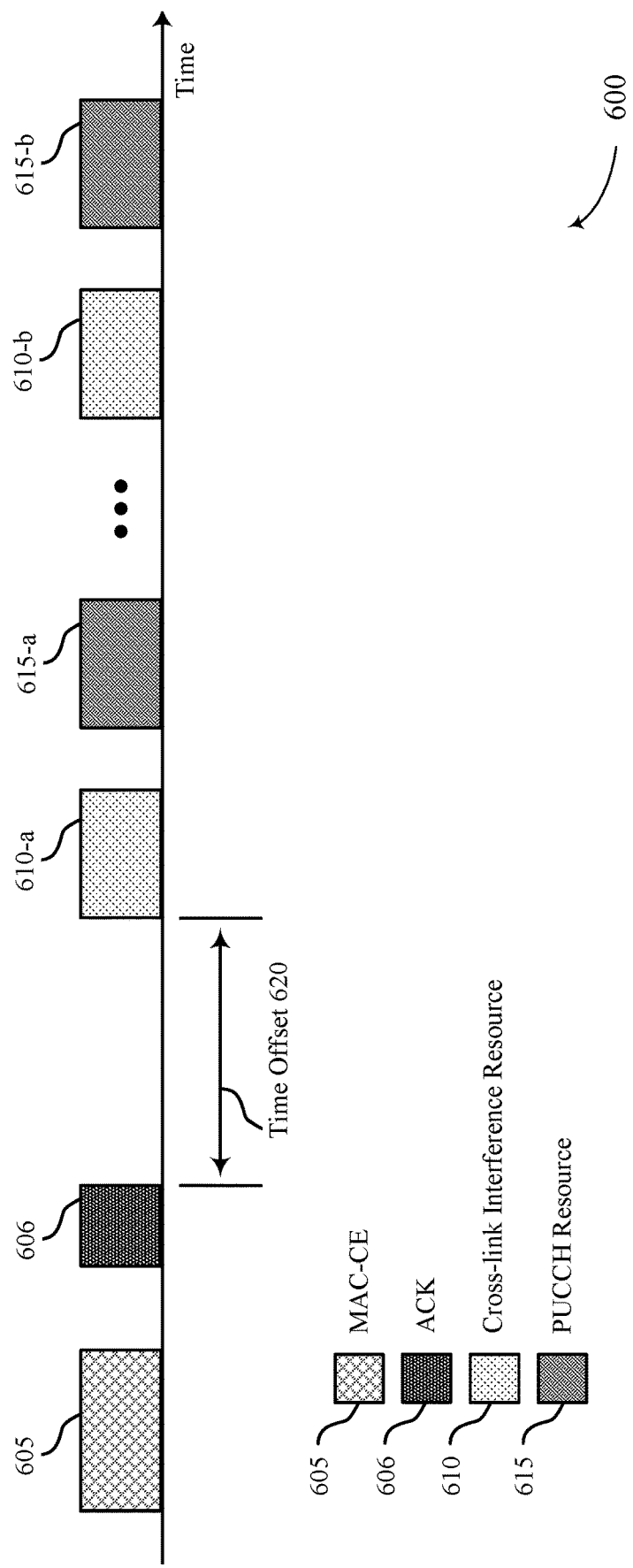

FIG. 6 illustrates an example of a timing diagram 600 that supports UE processing capability aspects for cross-link interference measurement in accordance with one or more aspects of the present disclosure. In some examples, the timing diagram 600 may implement or be implemented by one or more aspects of the wireless communications system 100 and the wireless communications system 300. For example, the timing diagram 600 may be implemented by a UE and a network entity, which may be examples of the corresponding devices as described with reference to FIGS. 1 and 3A. In the example of FIG. 6, the network entity may be an example of a CU 160, a DU 165, or an RU 170, a base station 140, an IAB node 104, a transmission-reception point, or one or more other network nodes as described with reference to FIG. 1. The timing diagram 600 may include features for improved communications between the UE and the network, among other benefits.

As illustrated in the example of FIG. 6, the network may indicate (e.g., trigger) for the UE to perform semi-persistent cross-link interference reporting over one or more PUCCH resources 615 (e.g., a PUCCH resource 615-*a* or a PUCCH resource 615-*b*) via a MAC-CE 605. For example, the MAC-CE 605 (e.g., an activation MAC-CE) may activate (or deactivate) a set of a set of cross-link interference report configuration identifiers (e.g., indicated via a CLI-ReportConfig IE) that may be suitable for (e.g., applicable to) semi-persistent cross-link interference reporting. In some examples, such cross-link interference reporting may occur (e.g., take effect) subsequent to (e.g., after about 3 ms) an acknowledgment message (e.g., an ACK 606) transmitted by the UE (e.g., in response to receiving the MAC-CE 605). For example, cross-link interference resources (e.g., a cross-link interference resource 610-*a* and a cross-link interference resource 610-*b*) may be activated by the MAC-CE 605 and may occur subsequent to a time offset 620 that may be measured from an end time of a slot including the ACK 606.

In some examples, the network may activate semi-persistent cross-link interference reporting on the PUCCH via a MAC-CE dedicated for cross-link interference reporting. For example, the MAC-CE 605 may be different from a MAC-CE used to activate semi-persistent channel state information reporting. That is, a MAC-CE type used for triggering cross-link interference reporting may be different from a MAC-CE type used for triggering channel state information reporting. Additionally, or alternatively, the network may activate semi-persistent cross-link interference reporting on the PUCCH via a same MAC-CE as may be used to activate semi-persistent channel state information reporting. In such an example, a configuration (e.g., indicate via a CLI-ReportConfig IE) used to configure the UE with parameters for cross-link interference reporting and a configuration (e.g., indicate via a CSI-ReportConfig IE) used to configure the UE with parameters for channel state information reporting may share a same identifier space. For example, resources for semi-persistent cross-link interference reporting and resources for semi-persistent channel state information report may be configured via a same list of resource set identifiers. That is, the MAC-CE 605 may include a resource set identifier field (e.g., a semi-persistent cross-link interference resource set identifier field or a semi-persistent channel state information reference signal resource set identifier field) that may include an index of a resource set (e.g., a resource set of multiple resources sets included in a list configured for the UE) and that resource set may correspond to a cross-link interference resource set (e.g., an NZP-CLI-ResourceSet IE), a channel state information reference signal resource set (e.g., an NZP-CSI-RS-ResourceSet IE), or a channel state information interference measurement resource set (e.g., an CSI-IM-ResourceSet IE).

The cross-link interference resource set may be an example of a cross-link interference resource set as described with reference to FIG. 3B. For example, the cross-link interference resource set may include resources (e.g., non-zero power cross-link interference resource) for performing cross-link interference measurements. Additionally, or alternatively, the channel state information reference signal resource set may be an example of a channel state information reference signal resource set as described with reference to FIG. 3B. For example, the channel state information reference signal resource set may include non-zero power channel state information reference signal resources. Additionally, or alternatively, the channel state information interference measurement resource set may be an example of a channel state information interference measurement resource set as described with reference to FIG. 3B. For example, the channel state information interference measurement resource set may include channel state information interference measurement resources.

In some examples, the network may configure the UE to report (e.g., indicate) the cross-link interference measurement (e.g., performed over the resource 610) with uplink control information. In such an example, the network may configure the UE with one or more rules for prioritize the cross-link interference report relative to other uplink control information, such as a channel state information report. For example, the network may configure the UE to transmit a report (e.g., an L1 report) including a channel state information report and a cross-link interference report (e.g., an L1 cross-link interference report). In some examples, however, resources (e.g., one or more PUCCH resources 615) allocated for transmitting the report may be insufficient to transmit both the channel state information report and the cross-link interference report (e.g., each report that is overlapping in time). Additionally, or alternatively, an amount (e.g., a total amount) of processing (e.g., CPU) consumed by the UE generating each report on a same time domain resource (e.g., symbol) may exceed a processing capability of the UE. In such examples, the UE may use a relative priority of the channel state information report and the cross-link interference report to determine whether to include both the cross-link interference report and the channel state information report in a same report.

For example, the network may configure a cross-link interference report as an uplink control information to be included in a channel state information report. In such an example, a relative priority may be assigned to the cross-link interference measurements (or report) and other measurements (or reports) to be indicated in a channel state information report. That is, multiple measurement (e.g., metrics) may be included in the channel state information report (e.g., a PUCCH report) based on a relative priority assigned to each of the multiple measurements. In some examples, RSRP measurements and signal to interference plus noise ratio (SINR) measurements may have an increased priority relative to the cross-link interference measurements. Additionally, or alternatively, the RSRP measurements, the SINR measurements, and the cross-link interference measurements may each have an increased priority relative to other channel state information to be included in the channel state information report (e.g., if other factors are approximately equal). In some examples, factors that may impact the relative priority of measurements (or reports) to be included in the channel state information report may include a report type (or a resource type for transmitting the report), a serving cell identifier, or a report configuration identifier (e.g., indicate via the reportConfigID IE).

In some examples, the UE may determine that the processing available to the UE for cross-link interference measurement and reporting fails to satisfy a threshold. For example, if the network indicates for the UE to report cross-link interference and channel state information, the central processing unit of the UE may become overloaded. In such an example, the central processing unit may exceed a threshold processing power (e.g., a threshold central processing unit power) available to the UE. Therefore, the UE may determine whether to transmit the cross-link interference report, the channel state information report based on comparing a priority associated with the cross-link interference measurement and a priority associated with the channel state information measurement. That is, the UE may determine whether to drop the cross-link interference report or the channel state information report based on a relative priority of each report (e.g., that may be different from a relative priority order of the PUCCH report).

Figure 7:
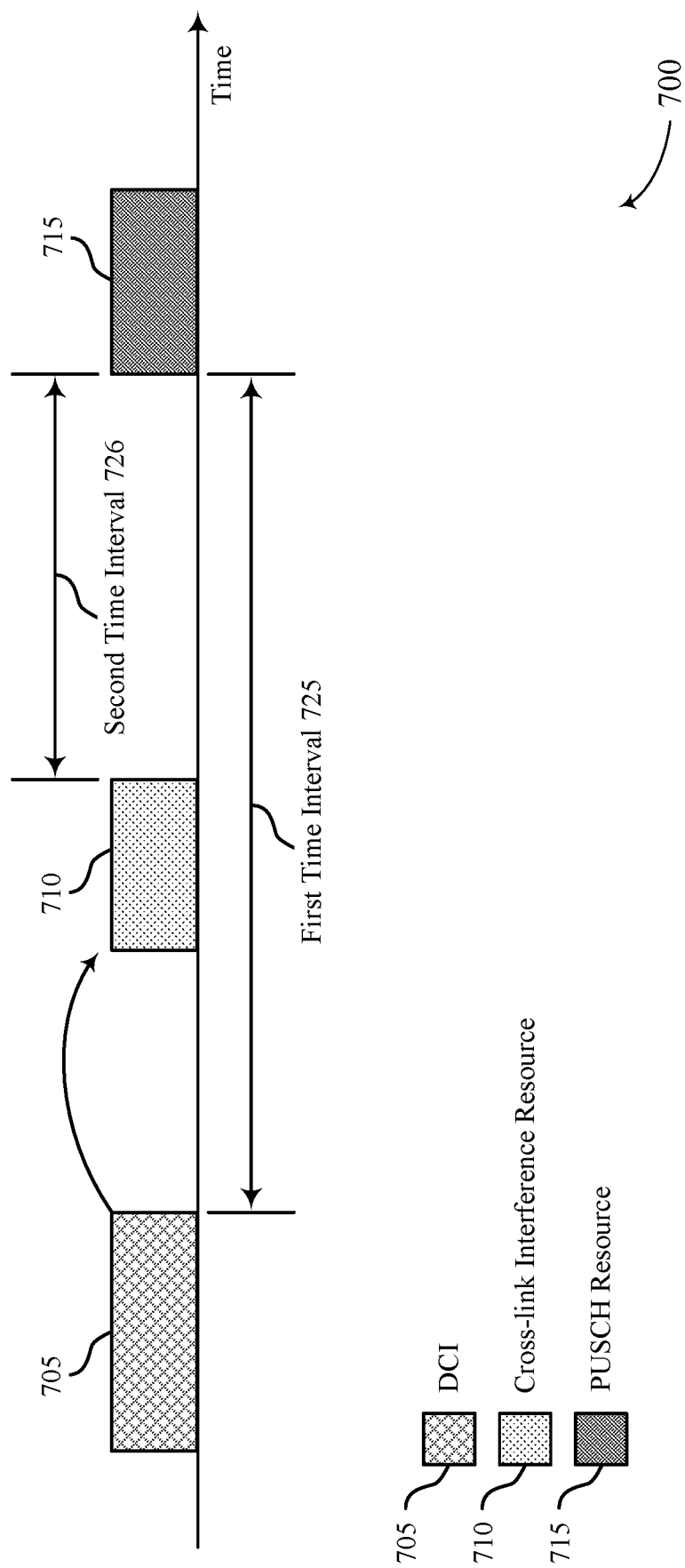

FIG. 7 illustrates an example of a timing diagram 700 that supports UE processing capability aspects for cross-link interference measurement in accordance with one or more aspects of the present disclosure. In some examples, the timing diagram 700 may implement or be implemented by one or more aspects of the wireless communications system 100 and the wireless communications system 300. For example, the timing diagram 700 may be implemented by a UE and a network entity, which may be examples of the corresponding devices as described with reference to FIGS. 1, 2, and 3A. In the example of FIG. 7, the network entity may be an example of a CU 160, a DU 165, or an RU 170, a base station 140, an IAB node 104, a transmission-reception point, or one or more other network nodes as described with reference to FIGS. 1, 2, and 3A. The timing diagram 700 may include features for improved communications between the UE and the network, among other benefits.

As illustrated in the example of FIG. 7, the network may configure the UE to perform cross-link interference measurement and reporting aperiodically, such as via dynamic signaling (e.g., via a DCI 705). For example, the network may transmit the DCI 405 indicating for the UE to measure and report cross-link interference. In some examples, the DCI 705 may indicate (e.g., schedule) cross-link interference resources 710 over which the UE may perform the cross-link interference measurements. Additionally, or alternatively, the network may indicate one or more frequency domain resources, such as PUSCH resources over which the UE may report the cross-link interference measurement (e.g., via a cross-link interference report). In some examples, the indicated PUSCH resources (e.g., a PUSCH resource 715) may be periodic, semi-persistent, or aperiodic.

In some examples, however, a time duration between a time in which the UE may receive the DCI 705 and a time in which the cross-link interference resource 710 (or the PUSCH resource 715) may occur may be relatively short time, thereby increasing processing at the UE. In such an example (e.g., due to the increased processing), the UE may not be capable of supporting the signaling request of the DCI 705 for performing the cross-link interference measurement and reporting. Therefore, to reduce processing at the UE for cross-link interference measurement and reporting, the network may configure the UE for cross-link interference reporting based on processing capabilities of the UE.

For example, the UE may transmit control signaling indicating a processing capability of the UE for cross-link interference measurement and reporting. In some examples, the UE processing capability may indicate a processing timeline for a cross-link interference report. For example, the UE processing capability may indicate a processing timeline for a control message that triggers a cross-link interference measurement (e.g., the DCI 705), the cross-link interference measurement (e.g., the cross-link interference resource 710 over which the UE may perform the cross-link interference measurement), and a cross-link interference report (e.g., the PUSCH resource 715 over which the UE may transmit an indication of the cross-link interference measurement). In some examples, the UE may indicate the processing timeline via one or more parameters (e.g., processing delay metrics), such as one or more processing delay metrics (e.g., Z, Z'). In some examples, the one or more processing delay metrics may be a same one or more delay metrics as may be used to indicate processing delay capabilities of the UE for channel state information reporting (e.g., Z, Z'). Additionally, or alternatively, the processing delay metrics may be configured (e.g., fixed, pre-defined, preconfigured) for the UE or determined at the UE.

In some examples, a first processing delay metric (e.g., Z) may indicate a first time interval 725 (e.g., a first quantity of symbols, mini-slots, slots, subframes, frames, or other time interval) from the DCI 705 (e.g., the control message that triggers the cross-link interference measurement) to the PUSCH resource 715 (e.g., the cross-link interference report). Additionally, or alternatively, a second processing delay metric (e.g., Z') may indicate a second time interval 726 (e.g., a second quantity of symbols) from the cross-link interference resource 710 (e.g., the cross-link interference measurement) and the PUSCH resource 715 (e.g., the cross-link interference report).

Figure 8:
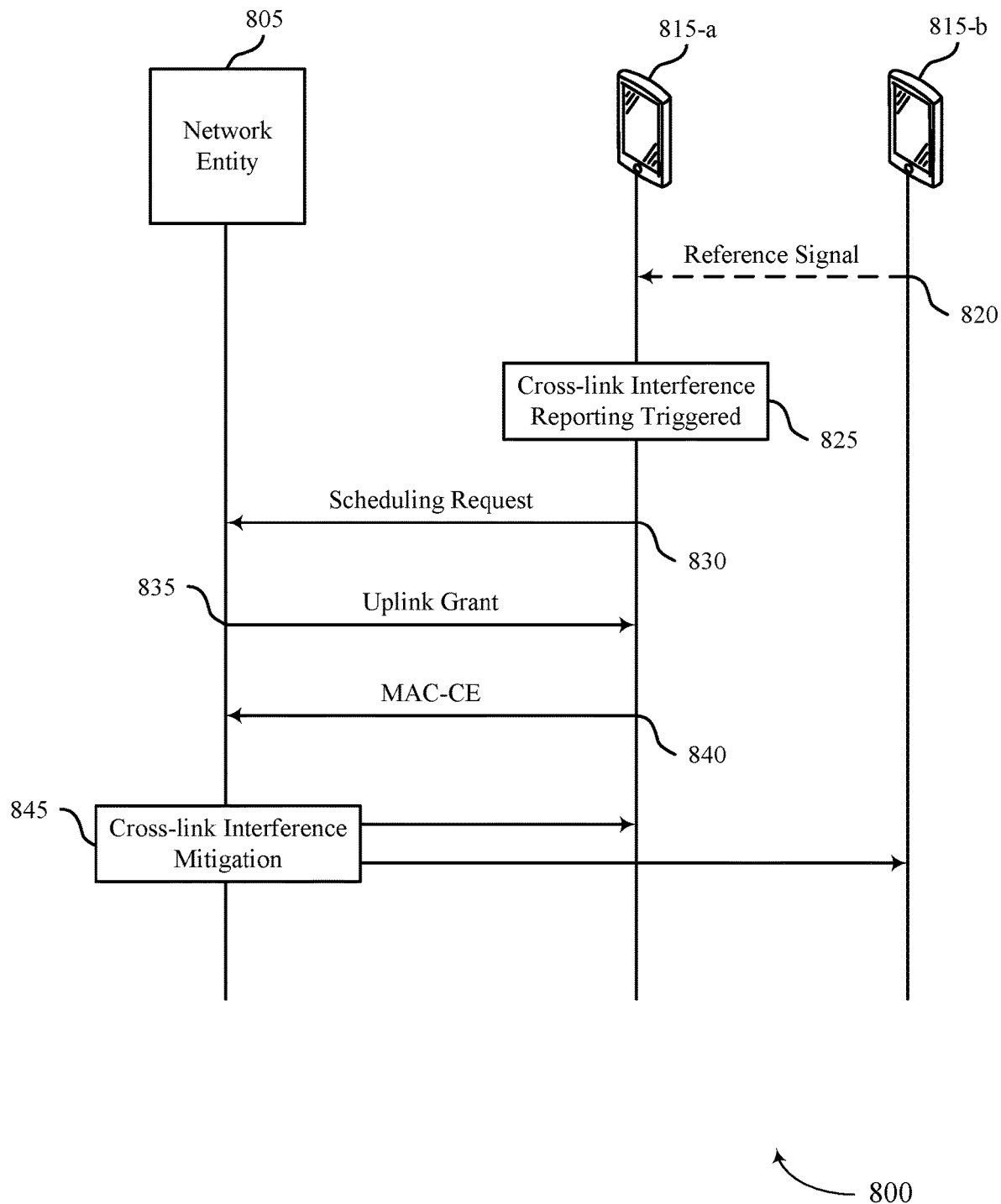
FIGS. 8 and 9 each illustrate an example of a process flow that supports UE processing capability aspects for cross-link interference measurement in accordance with one or more aspects of the present disclosure.

FIG. 8 illustrates an example of a process flow 800 that supports UE processing capability aspects for cross-link interference measurement in accordance with one or more aspects of the present disclosure. The process flow 800 may implement or be implemented by one or more aspects of the wireless communications system 100 and the wireless communications system 300. For example, the process flow 800 may include a network entity 805 and one or more UEs 815 (e.g., a UE 815-a and a UE 815-b), which may be examples of the corresponding devices as described with reference to FIGS. 1 and 3A. The process flow 800 may be implemented by the network entity 805, the UEs 815, or both. In the following description of the process flow 800, operations between the network entity 805 and the UEs 815 may occur in a different order or at different times than as shown. Some operations may also be omitted from the process flow 800, and other operations may be added to the process flow 800. The process flow 800 may include features for improved communications between the UEs 815 and the network, among other benefits.

In some examples, the UE 815-a may be configured to transmit a cross-link interference report based on one or more rules (e.g., an event). That is, cross-link interference reporting, such as higher layer cross-link interference reporting or lower layer cross-link interference reporting, may be event triggered. For higher layer cross-link interference reporting (e.g., L3 cross-link interference reporting), the UE 815-a may be configured with resources (e.g., periodic resources) for performing cross-link interference measurements on reference signals (e.g., SRSs) transmitted from other UEs. In such an example, if a value of a measured metric (e.g., a measured cross-link inference metric, an RSRP metric, an RSSI metric) of a resource in the resource list satisfies a threshold (e.g., exceeds a threshold, fails to exceed a threshold) the UE 815-a may determine to report the measured cross-link interference metric.

In some examples, the UE 815-a may be triggered to transmit a report (or multiple reports) indicating multiple cross-link interference metrics (e.g., corresponding to multiple cross-link interference measurements) collected over a time duration. In some examples, the time duration may start based on an entering condition being satisfied: The entering condition may be satisfied (e.g., reporting may be triggered to begin) if the measured cross-link interference metric satisfies a threshold (e.g., exceeds a threshold, fails to exceed a threshold). In some examples, the UE 815-a may account for hysteresis of the system prior to determining whether the cross-link interference metric satisfies the threshold. For example, the UE 815-a may subtract a value corresponding to one or more previous measurements (e.g., hysteresis) from the cross-link interference metric prior to comparing the cross-link interference metric to the threshold. In some examples, the time duration may end based on an leaving (e.g., exiting) condition being satisfied: The leaving condition may be satisfied (e.g., reporting may be triggered to end) if the measured cross-link interference metric fails to satisfy a threshold (e.g., fails to exceed a threshold). In some examples, the UE 815-a may account for hysteresis of the system prior to determining whether the cross-link interference metric satisfies the threshold. For example, the UE 815-a may add a value corresponding to the one or more previous measurements (e.g., hysteresis) to the cross-link interference metric prior to comparing the cross-link interference metric to the threshold.

In some examples, the network may configure the UE 815-a with one or more parameters for cross-link interference reporting. For example, the network may configure the UE 815-a with a timeToTrigger parameter indicating a time duration between a time in which the entering condition may be satisfied and a time in which the cross-link interference report may be transmitted. Additionally, or alternatively, the network may configure the UE 815-a with a reportedMetric parameter indicating a cross-link interference metric (e.g., RSRP, RSSI) to be indicated in the cross-link interference report. Additionally, or alternatively, the network may configure the UE 815-a with a maxReportCLI parameter indicating a quantity of cross-link interference measurements (or cross-link interference metrics) to be indicated via the cross-link interference report. In some examples, if the quantity of cross-link measurements satisfying the threshold is relatively higher than a value of the maxReportCLI parameter, the UE 815-a may determine to report a quantity of cross-link interference measurements equal to the value of the maxReportCLI parameter. In some examples, the UE 815-a may be configured to select the quantity of cross-link interference metrics (e.g., to be indicated via the cross-link interference report) based on respective values of each cross-link interference measurement (e.g., satisfying the threshold).

Additionally, or alternatively, the network may configure the UE 815-*a* with a reportInterval parameter indicating a periodicity at which cross-link interference reports may be transmitted by the UE 815-*a* (e.g., over a duration between the entering condition being satisfied and the leaving condition being satisfied). Additionally, or alternatively, the network may configure the UE 815-*a* with a reportAmount parameter indicating a quantity of reports that may be transmitted (e.g., over a duration between the entering condition being satisfied and the leaving condition being satisfied). Additionally, or alternatively, the network may configure the UE 815-*a* with a reportOnLeave metric indicating whether a report may be transmitted in response to the leaving condition being satisfied.

In some examples of lower layer cross-link interference reporting (e.g., L2 cross-link interference reporting, L1 cross-link interference reporting), the UE 815-*b* may be configured with cross-link interference resources (e.g., periodic resources, semi-persistent resources, aperiodic resources) for event triggered cross-link interference reporting. That is, the network may configure the UE 815-*a* with one or more parameters for event triggered cross-link interference reporting. The parameters for event triggered cross-link interference reporting may, in some examples, be common to both cross-link interference reporting and channel state information reporting. For example, the network may configure the UE 815-*a* with a parameter indicating for the UE 815-*a* to report a cross-link interference metric, such as an RSRP metric (e.g., indicated via a L1-SRS-RSRP IE) or an RSSI metric (e.g., indicated via a L1-CLI-RSSI IE) via the cross-link interference report.

As illustrated in the example of FIG. 8, the UE 815-*a* may report cross-link interference based on a trigger. For example, the UE 815-*a* may be configured with resources (e.g., periodic resources, semi-persistent resources, or aperiodic resources) for performing cross-link interference measurements on reference signals (e.g., SRSs) transmitted from other UEs, such as the UE 815-*b*. In such an example, if a value of the measured cross-link interference (e.g., a value of the cross-link interference metric) satisfies a threshold (e.g., exceeds a threshold, fails to exceed a threshold) the UE 815-*a* may determine to report the cross-link interference measurement. For example, the UE 815-*a* may perform a cross-link interference measurement on a reference signal transmitted from the UE 815-*b* at 820. A value of a cross-link interference metric corresponding to the cross-link interference measurement may satisfy the threshold (e.g., exceed a threshold, fail to exceed a threshold). Therefore, at 825, cross-link interference reporting may be triggered for the UE 815-*a*.

In some examples (e.g., once triggered), the UE 815-*a* may transmit the cross-link interference report via lower layer signaling. For example, the UE 815-*a* may transmit the cross-link interference report as uplink control information on periodic or semi-persistent resources (e.g., periodic or semi-persistent resources dedicated for cross-link interference reporting). In some examples, if the UE 815-*a* reports the cross-link interference report as uplink control information, the UE 815-*a* may determine whether to transmit the cross-link interference report with (or without) a channel state information report, for example based on a respective priority of the cross-link interference report and the channel state information report. Additionally, or alternatively, the UE 815-*a* may transmit the cross-link interference report via a MAC-CE in an uplink grant (e.g., over resources indicated via an uplink grant) requested by the UE 815-*a* via a scheduling request. For example, at 830, in response to cross-link interference reporting being triggered, the UE 815-*a* may transmit a scheduling request to the network entity 805. At 835, the UE 815-*a* may receive an uplink grant scheduling resources over which the UE 815-*a* may transmit a report indicating the cross-link interference metric.

At 845, the network entity 805 may perform one or more cross-link interference mitigation techniques based on receiving the cross-link interference report (e.g., via the MAC-CE transmitted at 840). For example, the network entity 805 may indicate for the UE 815-*a* (or the UE 815-*b*) to perform beam switching, such that cross-link interference experienced by the UE 815-*a* (e.g., due to uplink transmission from the UE 815-*b*) may be reduced. Additionally, or alternatively, the network may schedule downlink transmissions for the UE 815-*a* and uplink transmission for the UE 815-*b*, such that the downlink transmission and the uplink transmissions may be non-overlapping, thereby reducing cross-link interference at the UE 815-*b*. In some examples, the network entity 805 may adjust TDM operations performed at the UE 815-*a* (or the UE 815-*b*), such that cross-link interference at the UE 815-*a* may be reduced.

Figure 9:
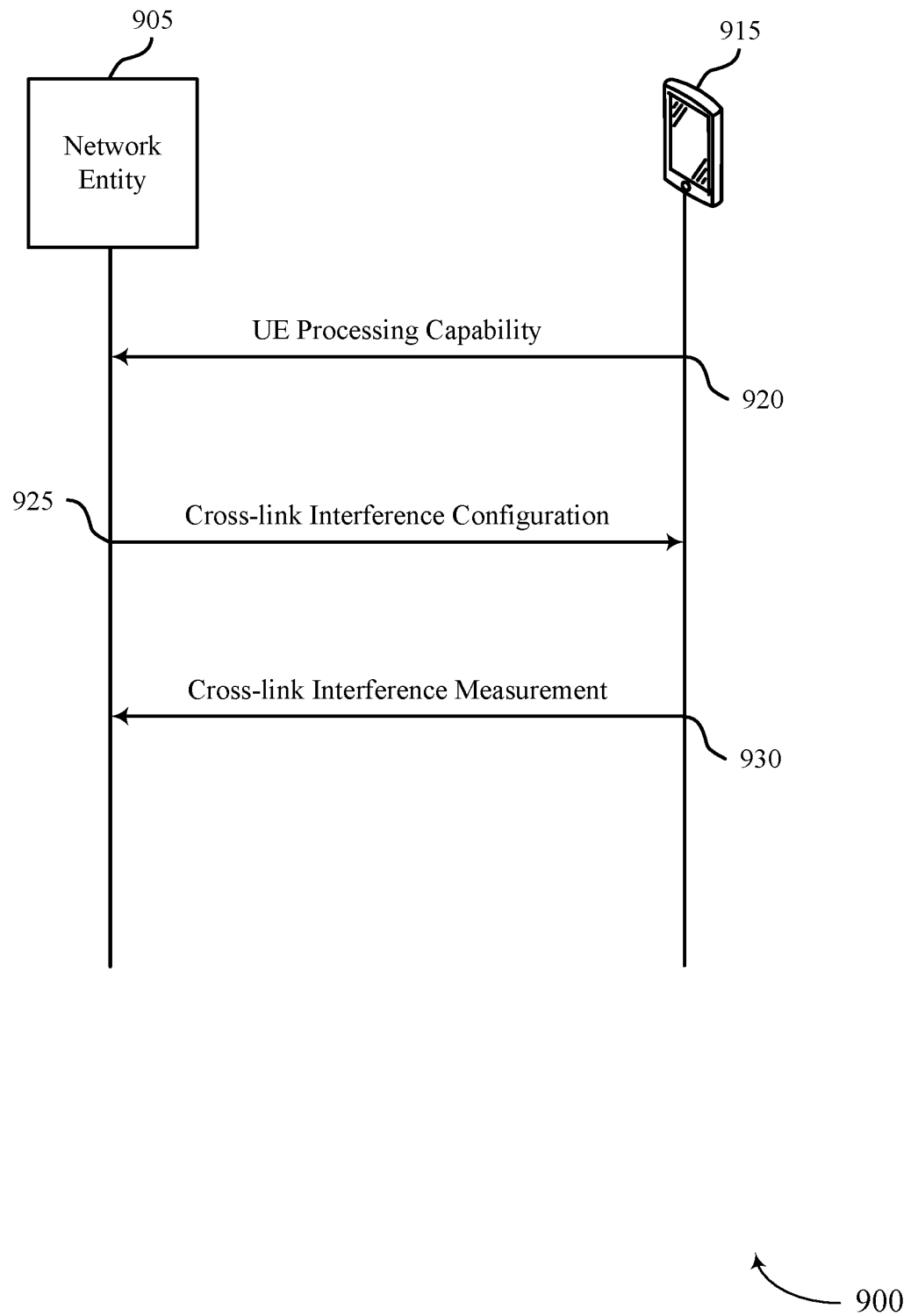

FIG. 9 illustrates an example of a process flow 900 that supports UE processing capability aspects for cross-link interference measurement in accordance with one or more aspects of the present disclosure. The process flow 900 may implement or be implemented by one or more aspects of the wireless communications system 100 and the wireless communications system 300. For example, the process flow 900 may include a network entity 905 and a UE 915, which may be examples of the corresponding devices as described with reference to FIGS. 1, 2, and 3A. The process flow 900 may be implemented by the network entity 905, the UE 915, or both. In the following description of the process flow 900, operations between the network entity 905 and the UE 915 may occur in a different order or at different times than as shown. Some operations may also be omitted from the process flow 900, and other operations may be added to the process flow 900. The process flow 900 may include features for improved communications between the UE 915 and the network, among other benefits.

At 920 the UE 915 may transmit control signaling indicating a processing capability of the UE for cross-link interference measurement and reporting. The processing capability may be an example of a UE processing capability as described with reference to FIG. 3A. For example, the processing capability may indicate a quantity of reference signals (e.g., per time duration) measurable by the UE 915, a consumed processing power for cross-link interference resources (e.g., L1 cross-link interference resource), and a time duration for processing (e.g., by the UE 915) associated with cross-link interference measurement and reporting (e.g., a central processing unit occupied duration, an occupied duration), among other examples.

At 925, in response to the control signaling indicating the processing capability, the UE may receive control signaling indicating a configuration of the UE 915 for the cross-link interference measurement and reporting. The configuration may be an example of a cross-link interference configuration as described with reference to FIG. 3A. For example, the cross-link interference configuration may indicate resources to be used by the UE 915 for performing the cross-link interference measurement and reporting.

At 930, the UE 915 may transmit, to the network entity 905, a message generated by the UE according to the configuration. The message may be an example of a cross-link interference report as described with reference to FIG. 3A. For example, the cross-link interference report may indicate the cross-link interference measurement performed by the UE 915.

Figure 10:
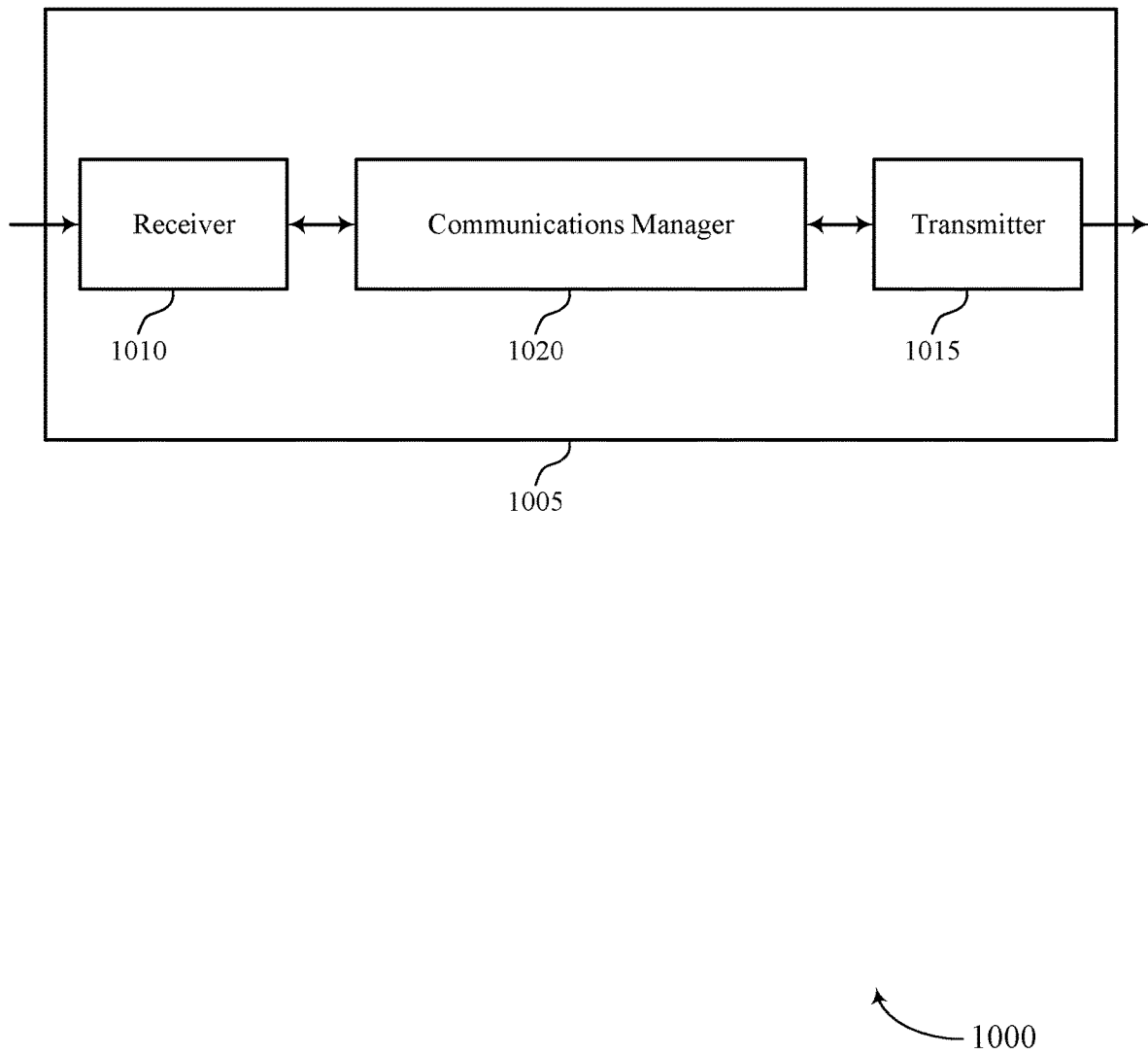
FIGS. 10 and 11 show block diagrams of devices that support UE processing capability aspects for cross-link interference measurement in accordance with one or more aspects of the present disclosure.

FIG. 10 shows a block diagram 1000 of a device 1005 that supports UE processing capability aspects for cross-link interference measurement in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to UE processing capability aspects for cross-link interference measurement). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to UE processing capability aspects for cross-link interference measurement). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of UE processing capability aspects for cross-link interference measurement as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE (e.g., the device 1005) in accordance with examples as disclosed herein. For example, the communications manager 1020 may be configured as or otherwise support a means for transmitting control signaling indicating a processing capability of the UE for cross-link interference measurement and reporting. The communications manager 1020 may be configured as or otherwise support a means for receiving, at least in part in response to the control signaling indicating the processing capability, control signaling indicating a configuration of the UE for the cross-link interference measurement and reporting. The communications manager 1020 may be configured as or otherwise support a means for transmitting, to a network entity, a message indicating a cross-link interference measurement generated by the UE according to the configuration.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing and more efficient utilization of communication resources.

Figure 11:
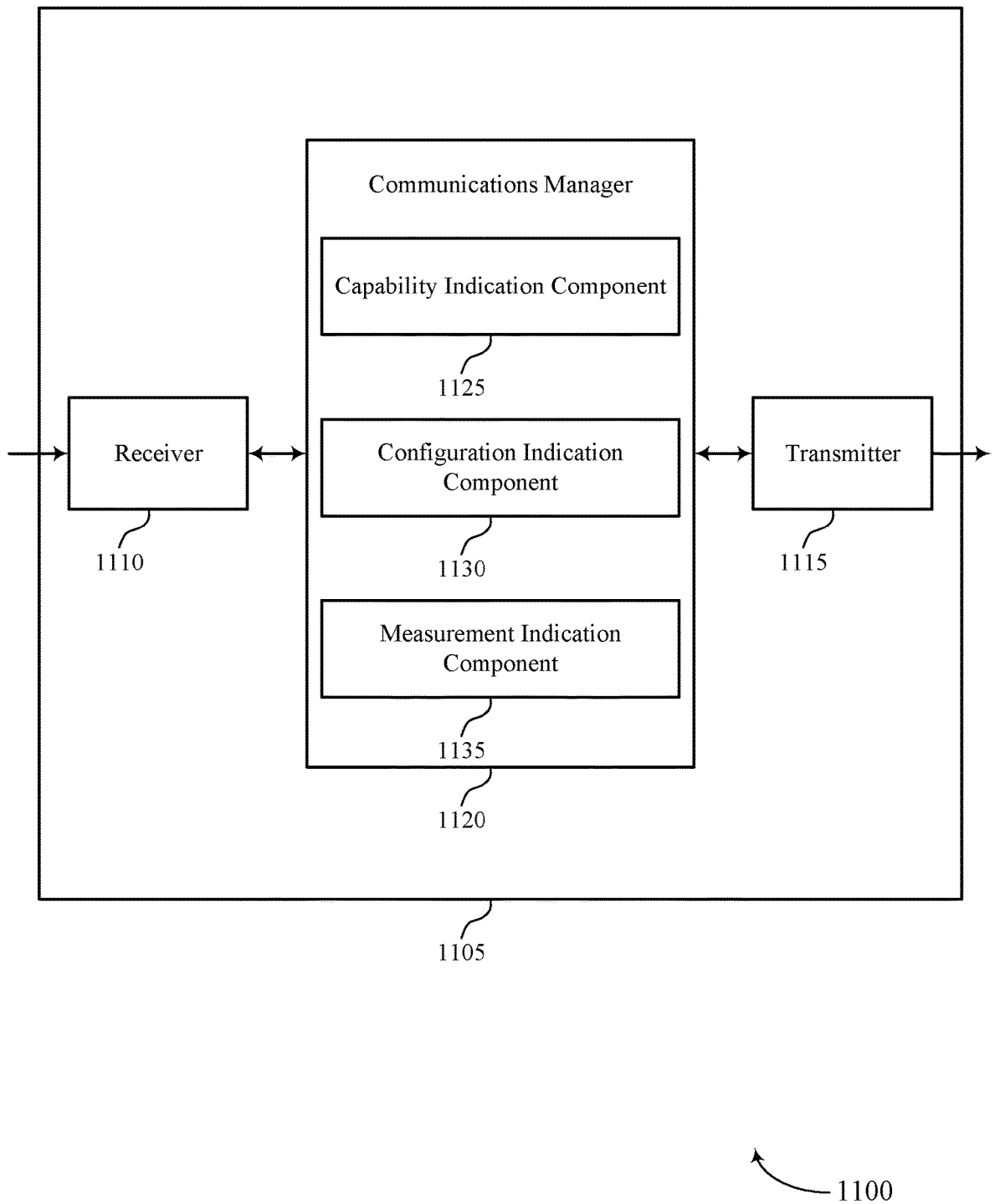

FIG. 11 shows a block diagram 1100 of a device 1105 that supports UE processing capability aspects for cross-link interference measurement in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to UE processing capability aspects for cross-link interference measurement). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to UE processing capability aspects for cross-link interference measurement). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of UE processing capability aspects for cross-link interference measurement as described herein. For example, the communications manager 1120 may include a capability indication component 1125, a configuration indication component 1130, a measurement indication component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a UE (e.g., the device 1105) in accordance with examples as disclosed herein. The capability indication component 1125 may be configured as or otherwise support a means for transmitting control signaling indicating a processing capability of the UE for cross-link interference measurement and reporting. The configuration indication component 1130 may be configured as or otherwise support a means for receiving, at least in part in response to the control signaling indicating the processing capability, control signaling indicating a configuration of the UE for the cross-link interference measurement and reporting. The measurement indication component 1135 may be configured as or otherwise support a means for transmitting, to a network entity, a message indicating a cross-link interference measurement generated by the UE according to the configuration.

Figure 12:
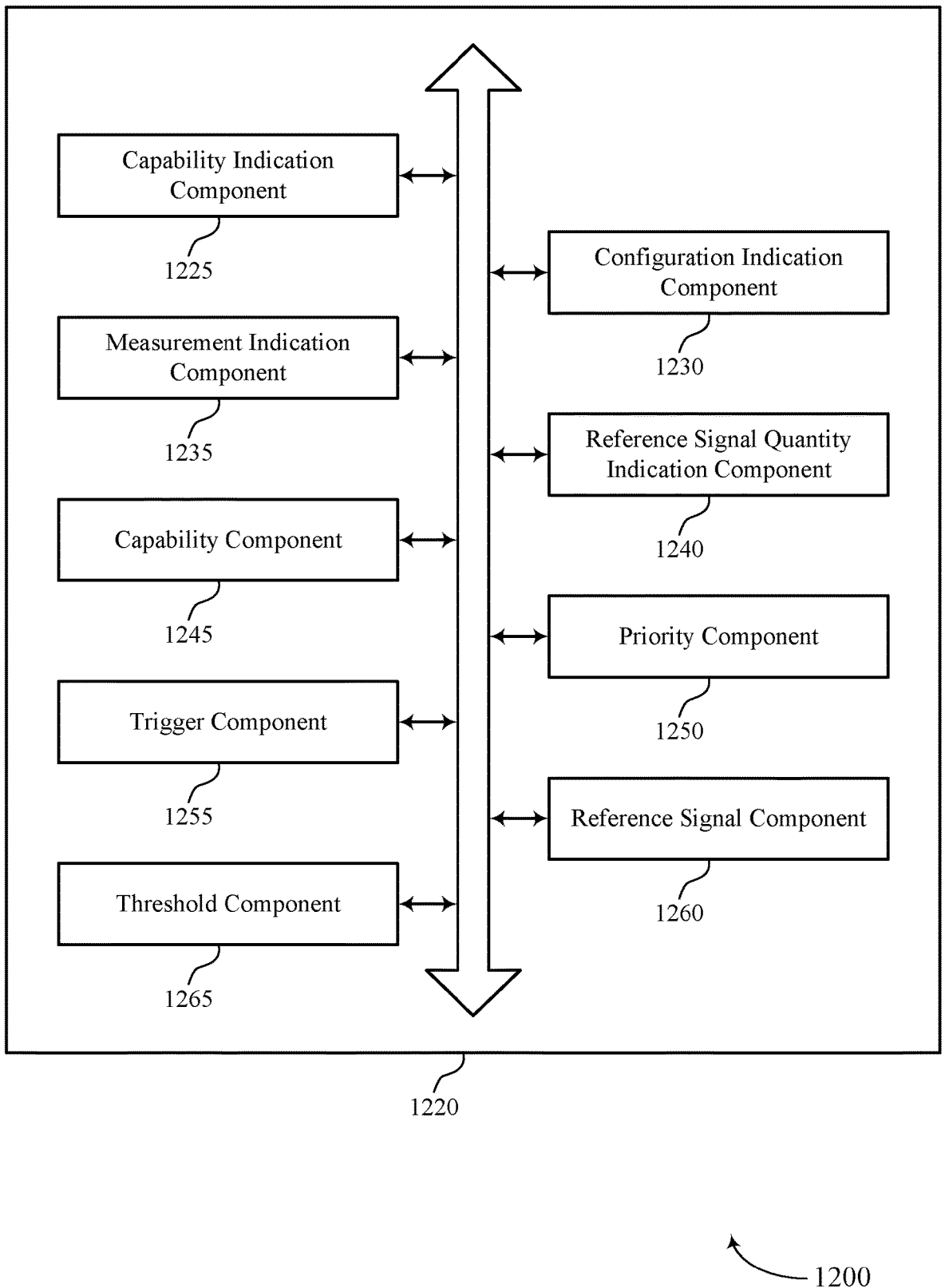
FIG. 12 shows a block diagram of a communications manager that supports UE processing capability aspects for cross-link interference measurement in accordance with one or more aspects of the present disclosure.

FIG. 12 shows a block diagram 1200 of a communications manager 1220 that supports UE processing capability aspects for cross-link interference measurement in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of UE processing capability aspects for cross-link interference measurement as described herein. For example, the communications manager 1220 may include a capability indication component 1225, a configuration indication component 1230, a measurement indication component 1235, a reference signal quantity indication component 1240, a capability component 1245, a priority component 1250, a trigger component 1255, a reference signal component 1260, a threshold component 1265, or any combination thereof. Each of these components may communicate, directly or indirectly, with one another (e.g., via one or more buses).

The communications manager 1220 may support wireless communication at a UE in accordance with examples as disclosed herein. The capability indication component 1225 may be configured as or otherwise support a means for transmitting control signaling indicating a processing capability of the UE for cross-link interference measurement and reporting. The configuration indication component 1230 may be configured as or otherwise support a means for receiving, at least in part in response to the control signaling indicating the processing capability, control signaling indicating a configuration of the UE for the cross-link interference measurement and reporting. The measurement indication component 1235 may be configured as or otherwise support a means for transmitting, to a network entity, a message indicating a cross-link interference measurement generated by the UE according to the configuration.

In some examples, to support transmitting the control signaling indicating the processing capability, the reference signal quantity indication component 1240 may be configured as or otherwise support a means for transmitting control signaling indicating a quantity of reference signals measurable by the UE for a slot. In some examples, to support transmitting the control signaling indicating the processing capability, the capability component 1245 may be configured as or otherwise support a means for transmitting control signaling indicating a processing power capability of the UE associated with cross-link interference measurement and reporting. In some examples, the processing power capability of the UE is per resource for cross-link interference measurement and reporting.

In some examples, to support transmitting the control signaling indicating the processing capability, the capability component 1245 may be configured as or otherwise support a means for transmitting control signaling indicating a time duration for processing associated with cross-link interference measurement and reporting. In some examples, to support transmitting the control signaling indicating the processing capability, the capability component 1245 may be configured as or otherwise support a means for transmitting control signaling indicating an amount of processing available to the UE for cross-link interference measurement and reporting.

In some examples, the threshold component 1265 may be configured as or otherwise support a means for determining that the processing available to the UE for cross-link interference measurement and reporting fails to satisfy a threshold. In some examples, the measurement indication component 1235 may be configured as or otherwise support a means for determining whether to transmit the message indicating the cross-link interference measurement or a second message indicating a channel state information measurement based on the processing available failing to satisfy the threshold and comparing a first priority associated with the cross-link interference measurement and a second priority associated with the channel state information measurement.

In some examples, to support transmitting the control signaling indicating the processing capability, the capability component 1245 may be configured as or otherwise support a means for transmitting control signaling indicating a processing timeline for a control message that triggers a cross-link interference measurement, the cross-link interference measurement, a cross-link interference report, or any combination thereof.

In some examples, the control signaling indicating the processing timeline includes a first value associated with a first time interval from the control message that triggers the cross-link interference measurement to the cross-link interference report, a second value associated with a second time interval from the cross-link interference measurement and the cross-link interference report, or any combination thereof.

In some examples, to support transmitting the message indicating the cross-link interference measurement, the priority component 1250 may be configured as or otherwise support a means for identifying a priority associated with the message indicating the cross-link interference measurement. In some examples, to support transmitting the message indicating the cross-link interference measurement, the measurement indication component 1235 may be configured as or otherwise support a means for transmitting the message indicating the cross-link interference measurement according to the priority.

In some examples, the priority associated with the message indicating the cross-link interference measurement includes a first priority, and the priority component 1250 may be configured as or otherwise support a means for identifying a second priority associated with a channel state information message to be transmitted on a same set of resources as the message indicating the cross-link interference measurement. In some examples, the priority associated with the message indicating the cross-link interference measurement includes a first priority, and the measurement indication component 1235 may be configured as or otherwise support a means for determining to transmit the message indicating the cross-link interference measurement and refrain from transmitting the channel state information message based on comparing the first priority to the second priority. In some examples, the first priority is associated with both the message indicating the cross-link interference measurement and at least one type of channel state information message.

In some examples, the trigger component 1255 may be configured as or otherwise support a means for receiving, on a downlink control channel according to the configuration, a DCI message that triggers a cross-link interference measurement. In some examples, the reference signal component 1260 may be configured as or otherwise support a means for receiving one or more reference signals on a set of cross-link interference measurement resources according to the configuration and the DCI message. In some examples, the measurement indication component 1235 may be configured as or otherwise support a means for generating the cross-link interference measurement based on the one or more reference signals, where the message indicating the cross-link interference measurement is transmitted on an uplink control channel or an uplink shared channel.

Figure 13:
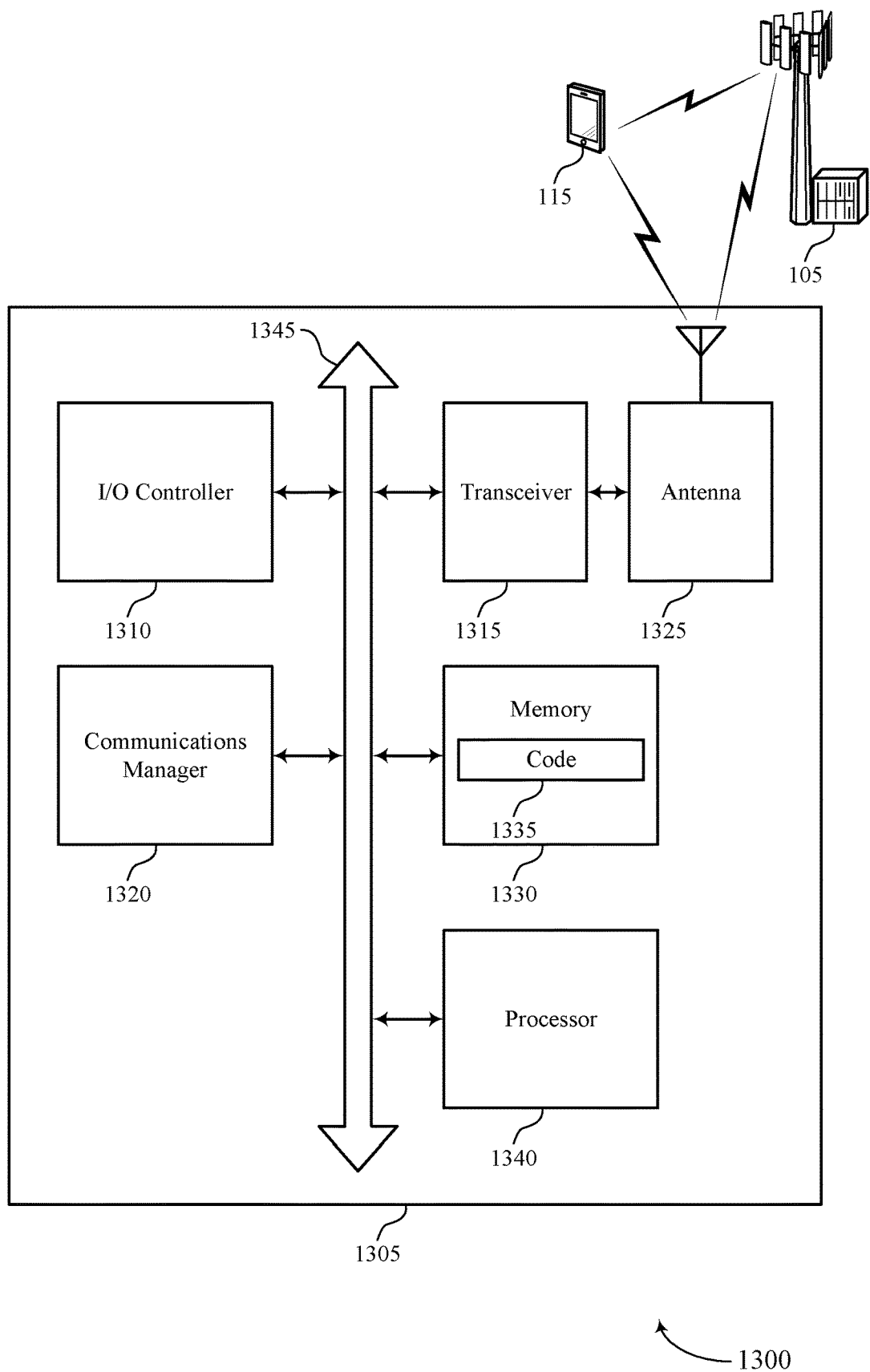
FIG. 13 shows a diagram of a system including a device that supports UE processing capability aspects for cross-link interference measurement in accordance with one or more aspects of the present disclosure.

FIG. 13 shows a diagram of a system 1300 including a device 1305 that supports UE processing capability aspects for cross-link interference measurement in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting UE processing capability aspects for cross-link interference measurement). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communication at a UE (e.g., the device 1305) in accordance with examples as disclosed herein. For example, the communications manager 1320 may be configured as or otherwise support a means for transmitting control signaling indicating a processing capability of the UE for cross-link interference measurement and reporting. The communications manager 1320 may be configured as or otherwise support a means for receiving, at least in part in response to the control signaling indicating the processing capability, control signaling indicating a configuration of the UE for the cross-link interference measurement and reporting. The communications manager 1320 may be configured as or otherwise support a means for transmitting, to a network entity, a message indicating a cross-link interference measurement generated by the UE according to the configuration.

By including or configuring the communications manager 1320 in accordance with examples as described herein, the device 1305 may support techniques for improved communication reliability, reduced latency, improved user experience related to reduced processing, more efficient utilization of communication resources, improved coordination between devices, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of UE processing capability aspects for cross-link interference measurement as described herein, or the processor 1340 and the memory 1330 may be otherwise configured to perform or support such operations.

Figure 14:
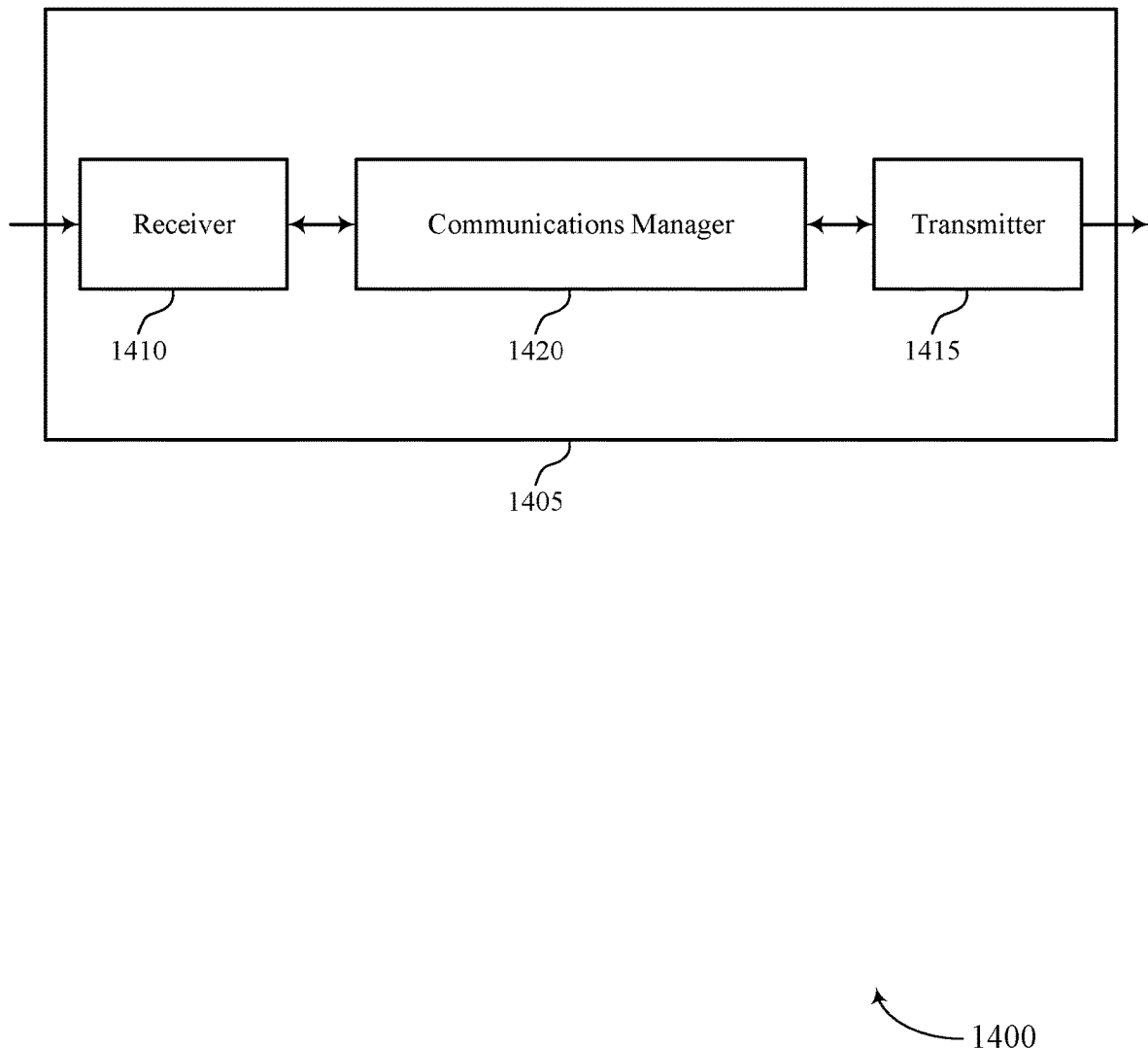
FIGS. 14 and 15 show block diagrams of devices that support UE processing capability aspects for cross-link interference measurement in accordance with one or more aspects of the present disclosure.

FIG. 14 shows a block diagram 1400 of a device 1405 that supports UE processing capability aspects for cross-link interference measurement in accordance with one or more aspects of the present disclosure. The device 1405 may be an example of aspects of a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of UE processing capability aspects for cross-link interference measurement as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a network entity (e.g., the device 1405) in accordance with examples as disclosed herein. For example, the communications manager 1420 may be configured as or otherwise support a means for obtaining control signaling indicating a processing capability of a UE for cross-link interference measurement and reporting. The communications manager 1420 may be configured as or otherwise support a means for outputting, at least in part in response to the control signaling indicating the processing capability, control signaling indicating a configuration of the UE for the cross-link interference measurement and reporting. The communications manager 1420 may be configured as or otherwise support a means for obtaining, from the UE, a message indicating a cross-link interference measurement and configured according to the configuration.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for reduced processing and more efficient utilization of communication resources.

Figure 15:
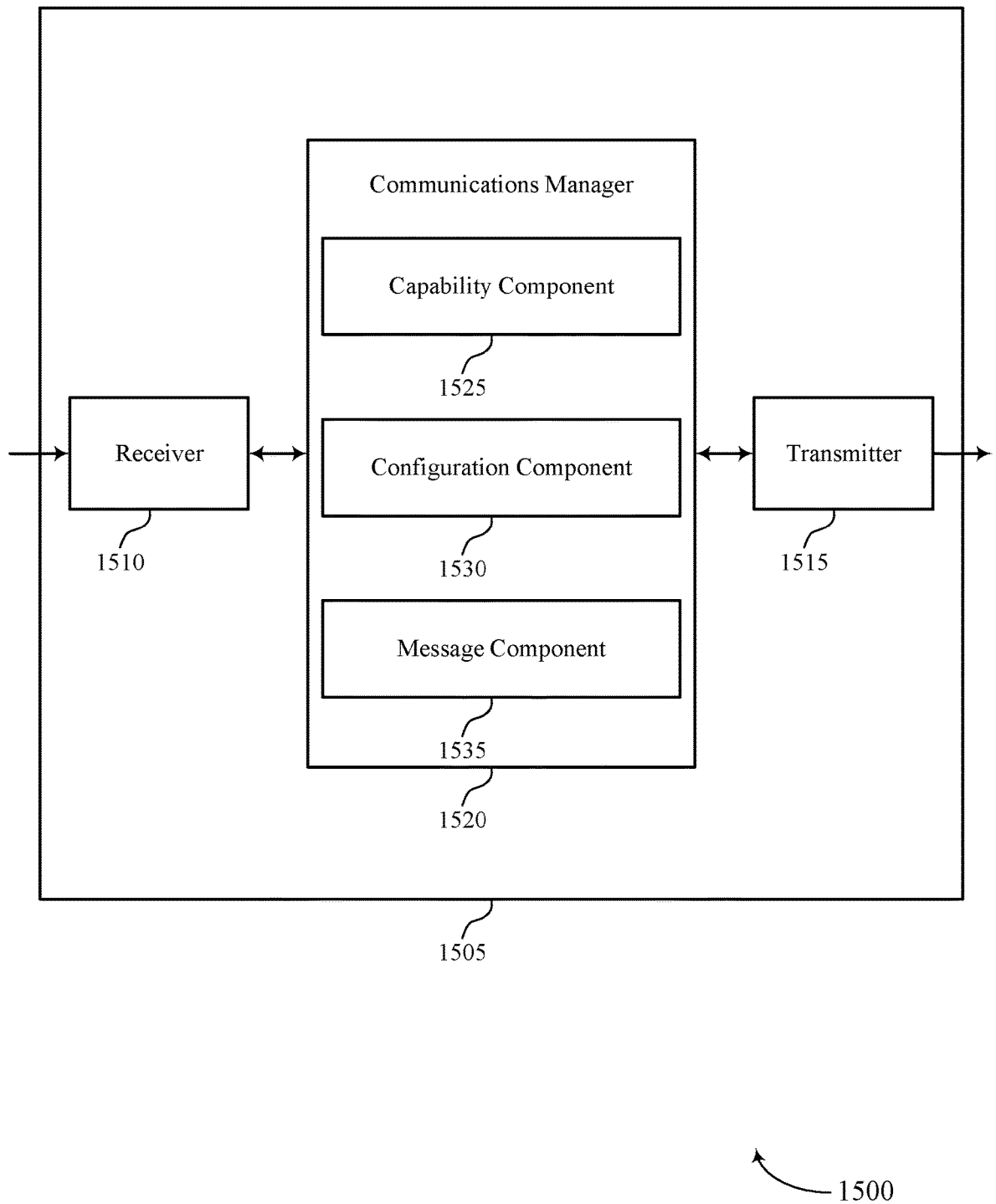

FIG. 15 shows a block diagram 1500 of a device 1505 that supports UE processing capability aspects for cross-link interference measurement in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of UE processing capability aspects for cross-link interference measurement as described herein. For example, the communications manager 1520 may include a capability component 1525, a configuration component 1530, a message component 1535, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communication at a network entity (e.g., the device 1505) in accordance with examples as disclosed herein. The capability component 1525 may be configured as or otherwise support a means for obtaining control signaling indicating a processing capability of a UE for cross-link interference measurement and reporting. The configuration component 1530 may be configured as or otherwise support a means for outputting, at least in part in response to the control signaling indicating the processing capability, control signaling indicating a configuration of the UE for the cross-link interference measurement and reporting. The message component 1535 may be configured as or otherwise support a means for obtaining, from the UE, a message indicating a cross-link interference measurement and configured according to the configuration.

Figure 16:
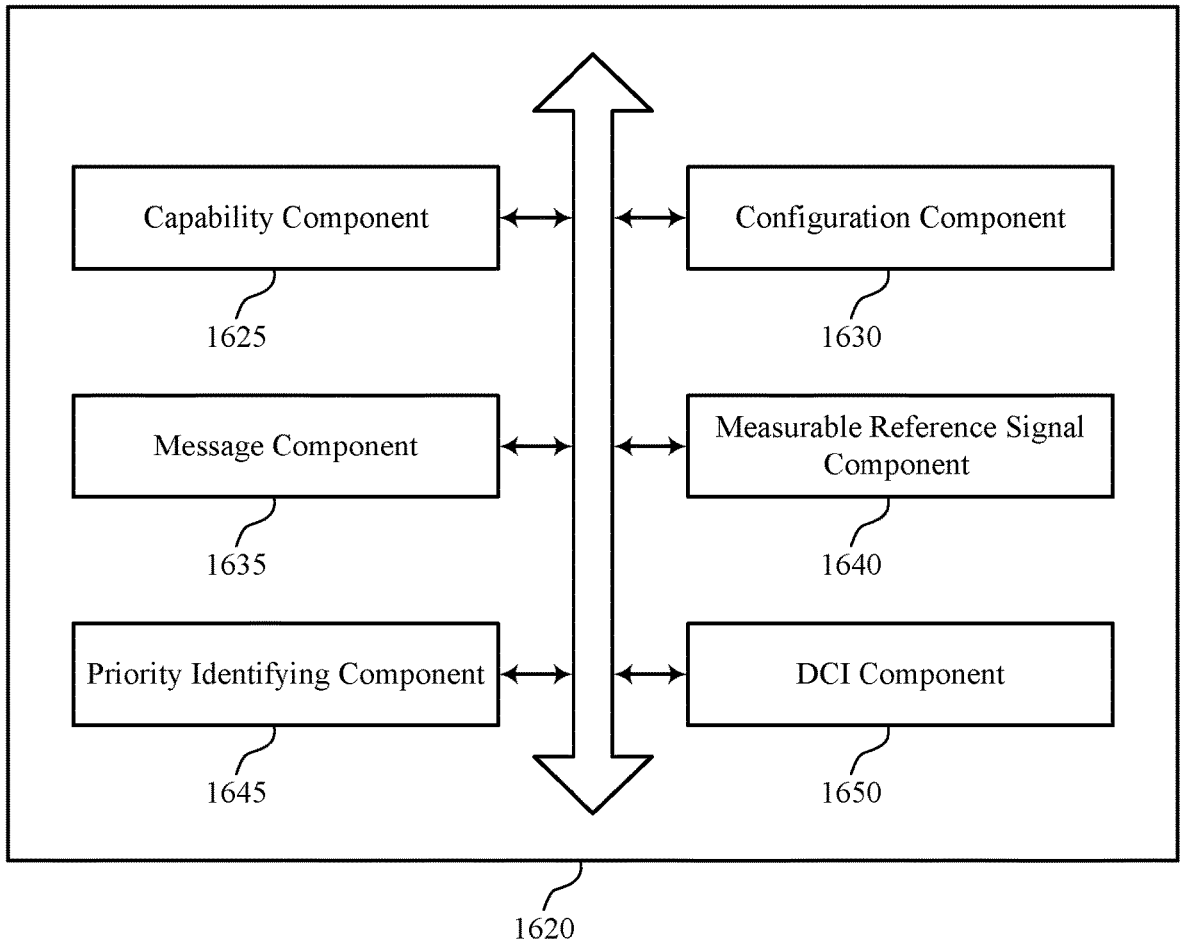
FIG. 16 shows a block diagram of a communications manager that supports UE processing capability aspects for cross-link interference measurement in accordance with one or more aspects of the present disclosure.

FIG. 16 shows a block diagram 1600 of a communications manager 1620 that supports UE processing capability aspects for cross-link interference measurement in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of UE processing capability aspects for cross-link interference measurement as described herein. For example, the communications manager 1620 may include a capability component 1625, a configuration component 1630, a message component 1635, a measurable reference signal component 1640, a priority identifying component 1645, a DCI component 1650, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communication at a network entity in accordance with examples as disclosed herein. The capability component 1625 may be configured as or otherwise support a means for obtaining control signaling indicating a processing capability of a UE for cross-link interference measurement and reporting. The configuration component 1630 may be configured as or otherwise support a means for outputting, at least in part in response to the control signaling indicating the processing capability, control signaling indicating a configuration of the UE for the cross-link interference measurement and reporting. The message component 1635 may be configured as or otherwise support a means for obtaining, from the UE, a message indicating a cross-link interference measurement and configured according to the configuration.

In some examples, to support obtaining the control signaling indicating the processing capability, the measurable reference signal component 1640 may be configured as or otherwise support a means for obtaining control signaling indicating a quantity of reference signals measurable by the UE for a slot. In some examples, to support obtaining the control signaling indicating the processing capability, the capability component 1625 may be configured as or otherwise support a means for obtaining control signaling indicating a processing power capability of the UE associated with cross-link interference measurement and reporting.

In some examples, to support obtaining the control signaling indicating the processing capability, the capability component 1625 may be configured as or otherwise support a means for obtaining control signaling indicating a time duration for processing associated with cross-link interference measurement and reporting. In some examples, to support obtaining the control signaling indicating the processing capability, the capability component 1625 may be configured as or otherwise support a means for obtaining control signaling indicating an amount of processing available to the UE for cross-link interference measurement and reporting.

In some examples, to support obtaining the control signaling indicating the processing capability, the capability component 1625 may be configured as or otherwise support a means for obtaining control signaling indicating a processing timeline for a control message that triggers a cross-link interference measurement, the cross-link interference measurement, a cross-link interference report, or any combination thereof.

In some examples, to support obtaining the message indicating the cross-link interference measurement, the priority identifying component 1645 may be configured as or otherwise support a means for identifying a priority associated with the message indicating the cross-link interference measurement. In some examples, to support obtaining the message indicating the cross-link interference measurement, the message component 1635 may be configured as or otherwise support a means for obtaining the message indicating the cross-link interference measurement according to the priority.

In some examples, the DCI component 1650 may be configured as or otherwise support a means for outputting, on a downlink control channel according to the configuration, a DCI message that triggers a cross-link interference measurement. In some examples, the DCI component 1650 may be configured as or otherwise support a means for outputting one or more reference signals on a set of cross-link interference measurement resources according to the configuration and based on the DCI message, where the message indicating the cross-link interference measurement is received on an uplink control channel or an uplink shared channel at least in part in response to the one or more reference signals.

Figure 17:
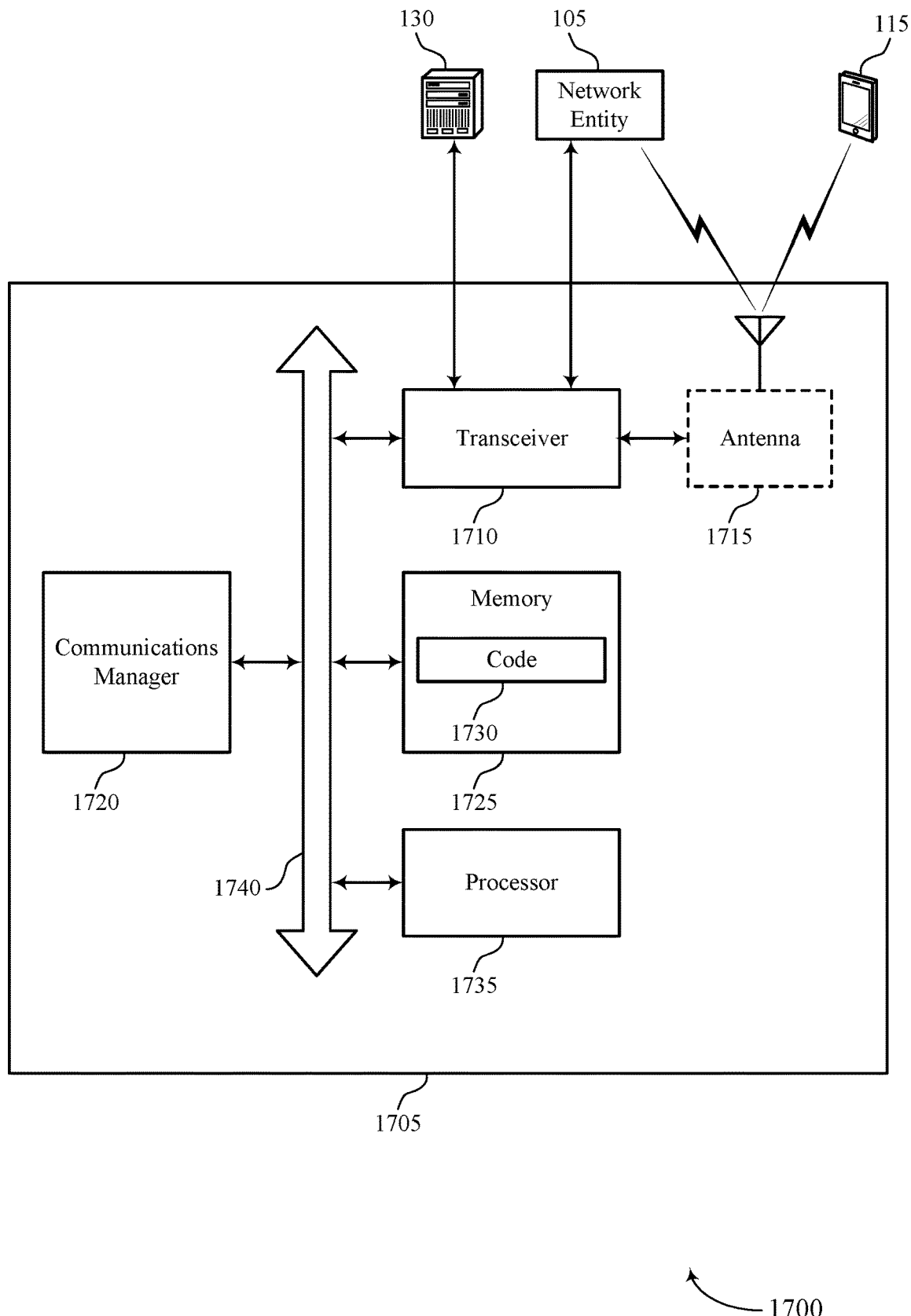
FIG. 17 shows a diagram of a system including a device that supports UE processing capability aspects for cross-link interference measurement in accordance with one or more aspects of the present disclosure.

FIG. 17 shows a diagram of a system 1700 including a device 1705 that supports UE processing capability aspects for cross-link interference measurement in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, a memory 1725, code 1730, and a processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. The transceiver 1710, or the transceiver 1710 and one or more antennas 1715 or wired interfaces, where applicable, may be an example of a transmitter 1415, a transmitter 1515, a receiver 1410, a receiver 1510, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting UE processing capability aspects for cross-link interference measurement). For example, the device 1705 or a component of the device 1705 may include a processor 1735 and memory 1725 coupled with the processor 1735, the processor 1735 and memory 1725 configured to perform various functions described herein. The processor 1735 may be an example of a cloud-computing platform (e.g., one or more physical nodes and supporting software such as operating systems, virtual machines, or container instances) that may host the functions (e.g., by executing code 1730) to perform the functions of the device 1705.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the memory 1725, the code 1730, and the processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with UEs 115 in cooperation with other network entities 105. In some examples, the communications manager 1720 may support an X2 interface within an LTE/LTE-A wireless communications network technology to provide communication between network entities 105.

The communications manager 1720 may support wireless communication at a network entity (e.g., the device 1705) in accordance with examples as disclosed herein. For example, the communications manager 1720 may be configured as or otherwise support a means for obtaining control signaling indicating a processing capability of a UE for cross-link interference measurement and reporting. The communications manager 1720 may be configured as or otherwise support a means for outputting, at least in part in response to the control signaling indicating the processing capability, control signaling indicating a configuration of the UE for the cross-link interference measurement and reporting. The communications manager 1720 may be configured as or otherwise support a means for obtaining, from the UE, a message indicating a cross-link interference measurement and configured according to the configuration.

By including or configuring the communications manager 1720 in accordance with examples as described herein, the device 1705 may support techniques for improved communication reliability, reduced latency, improved user experience related to reduced processing, more efficient utilization of communication resources, improved coordination between devices, and improved utilization of processing capability.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the processor 1735, the memory 1725, the code 1730, the transceiver 1710, or any combination thereof. For example, the code 1730 may include instructions executable by the processor 1735 to cause the device 1705 to perform various aspects of UE processing capability aspects for cross-link interference measurement as described herein, or the processor 1735 and the memory 1725 may be otherwise configured to perform or support such operations.

Figure 18:
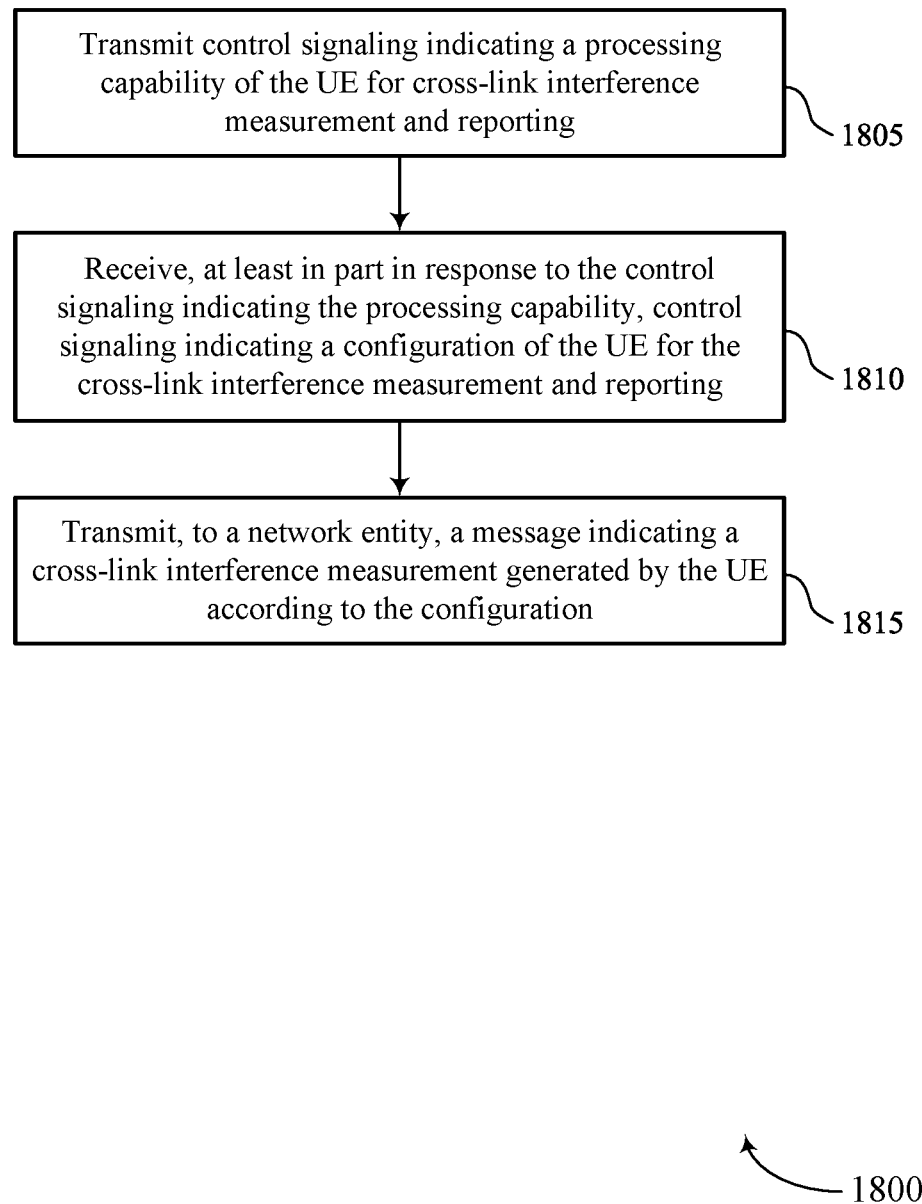
FIGS. 18 through 23 show flowcharts illustrating methods that support UE processing capability aspects for cross-link interference measurement in accordance with one or more aspects of the present disclosure.

FIG. 18 shows a flowchart illustrating a method 1800 that supports UE processing capability aspects for cross-link interference measurement in accordance with one or more aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include transmitting control signaling indicating a processing capability of the UE for cross-link interference measurement and reporting. The operations of 1805 may be performed in accordance with examples as disclosed herein. In some examples, aspects of the operations of 1805 may be performed by a capability indication component 1225 as described with reference to FIG. 12.

At 1810, the method may include receiving, at least in part in response to the control signaling indicating the processing capability, control signaling indicating a configuration of the UE for the cross-link interference measurement and reporting. The operations of 1810 may be performed in accordance with examples as disclosed herein. In some examples, aspects of the operations of 1810 may be performed by a configuration indication component 1230 as described with reference to FIG. 12.

At 1815, the method may include transmitting, to a network entity, a message indicating a cross-link interference measurement generated by the UE according to the configuration. The operations of 1815 may be performed in accordance with examples as disclosed herein. In some examples, aspects of the operations of 1815 may be performed by a measurement indication component 1235 as described with reference to FIG. 12.

Figure 19:
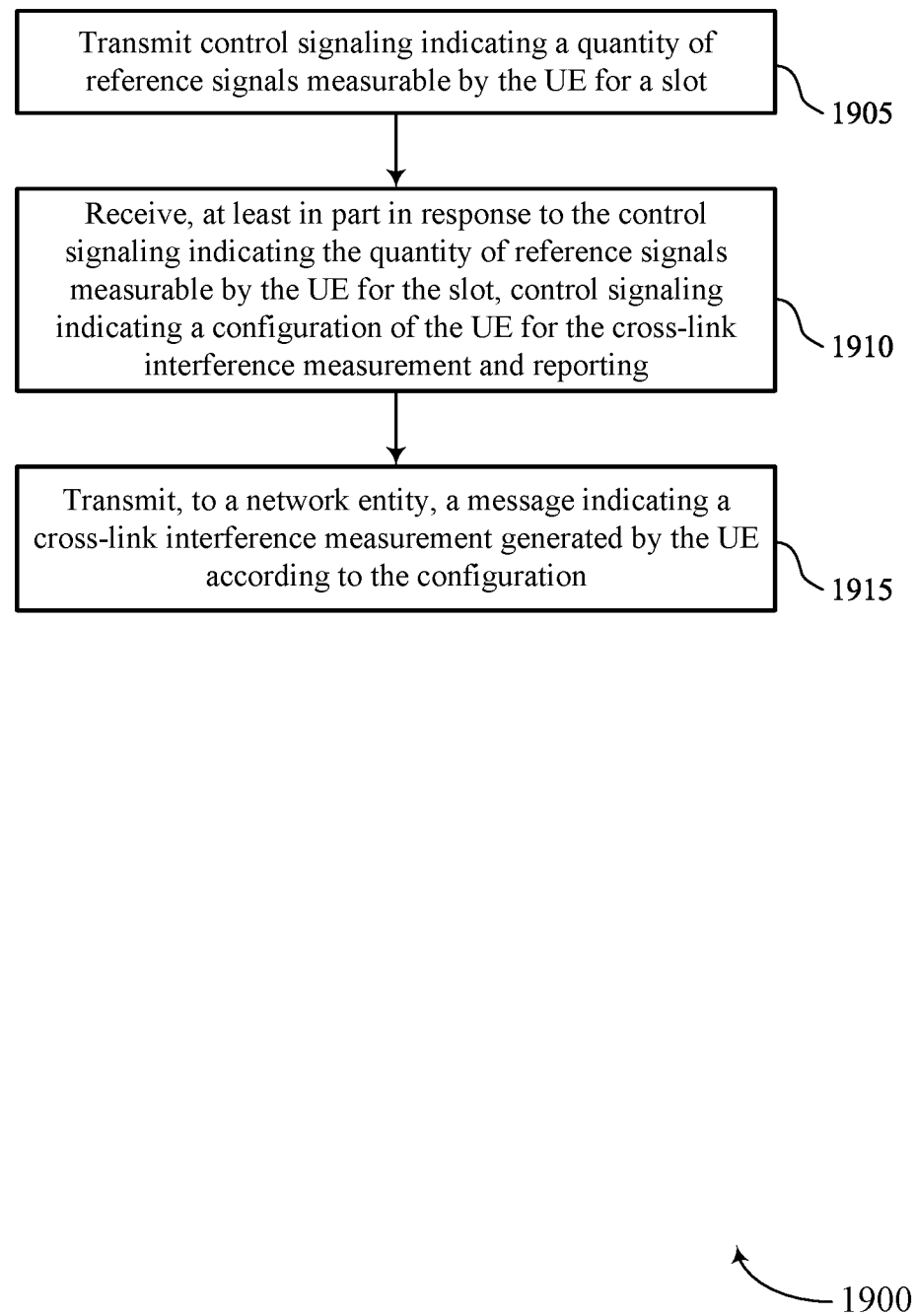

FIG. 19 shows a flowchart illustrating a method 1900 that supports UE processing capability aspects for cross-link interference measurement in accordance with one or more aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1905, the method may include transmitting control signaling indicating a quantity of reference signals measurable by the UE for a slot. The operations of 1905 may be performed in accordance with examples as disclosed herein. In some examples, aspects of the operations of 1905 may be performed by a reference signal quantity indication component 1240 as described with reference to FIG. 12.

At 1910, the method may include receiving, at least in part in response to the control signaling indicating the quantity of reference signals measurable by the UE for the slot, control signaling indicating a configuration of the UE for the cross-link interference measurement and reporting. The operations of 1910 may be performed in accordance with examples as disclosed herein. In some examples, aspects of the operations of 1910 may be performed by a configuration indication component 1230 as described with reference to FIG. 12.

At 1915, the method may include transmitting, to a network entity, a message indicating a cross-link interference measurement generated by the UE according to the configuration. The operations of 1915 may be performed in accordance with examples as disclosed herein. In some examples, aspects of the operations of 1915 may be performed by a measurement indication component 1235 as described with reference to FIG. 12.

Figure 20:
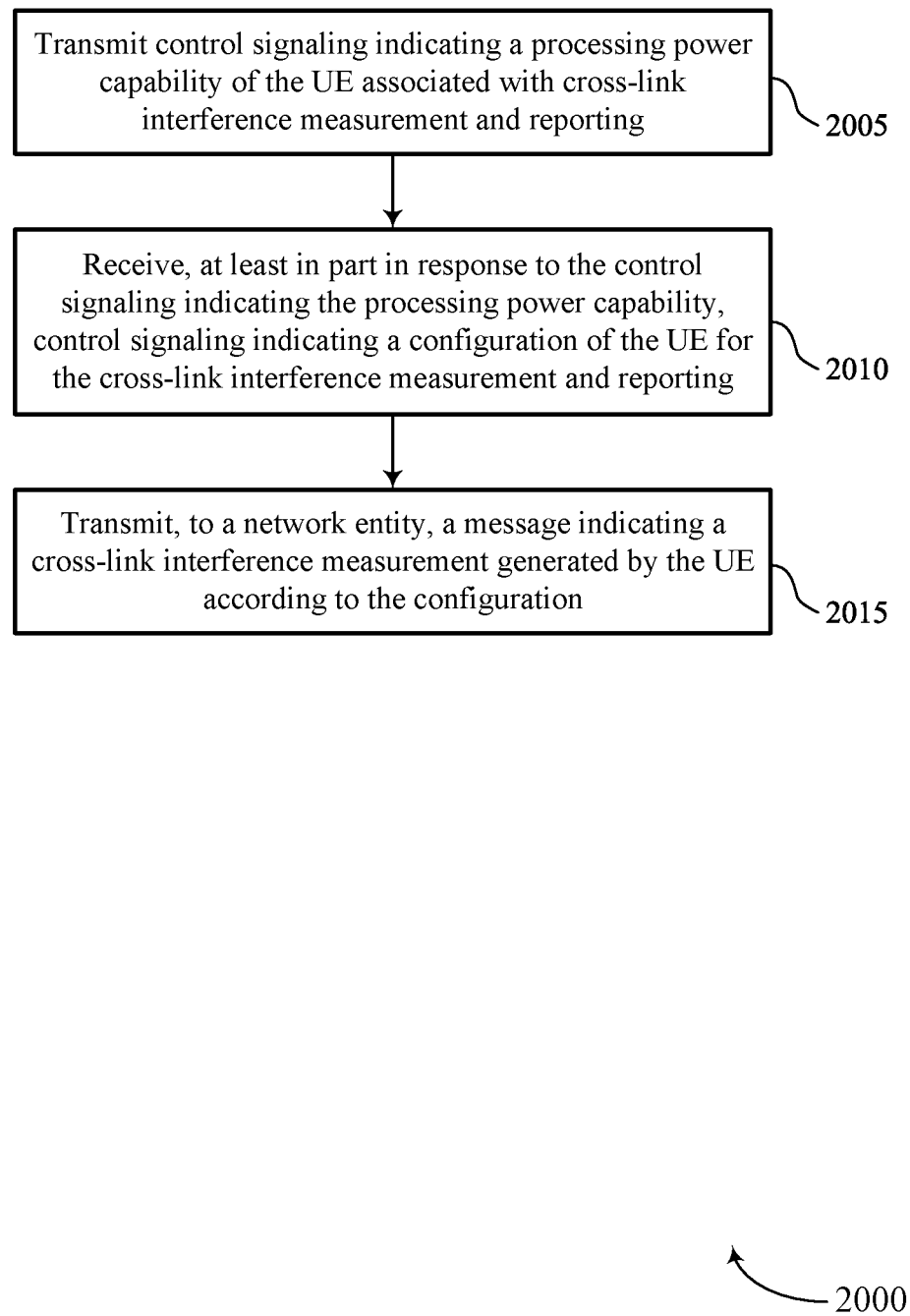

FIG. 20 shows a flowchart illustrating a method 2000 that supports UE processing capability aspects for cross-link interference measurement in accordance with one or more aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 2005, the method may include transmitting control signaling indicating a processing power capability of the UE associated with cross-link interference measurement and reporting. The operations of 2005 may be performed in accordance with examples as disclosed herein. In some examples, aspects of the operations of 2005 may be performed by a capability component 1245 as described with reference to FIG. 12.

At 2010, the method may include receiving, at least in part in response to the control signaling indicating the processing power capability, control signaling indicating a configuration of the UE for the cross-link interference measurement and reporting. The operations of 2010 may be performed in accordance with examples as disclosed herein. In some examples, aspects of the operations of 2010 may be performed by a configuration indication component 1230 as described with reference to FIG. 12.

At 2015, the method may include transmitting, to a network entity, a message indicating a cross-link interference measurement generated by the UE according to the configuration. The operations of 2015 may be performed in accordance with examples as disclosed herein. In some examples, aspects of the operations of 2015 may be performed by a measurement indication component 1235 as described with reference to FIG. 12.

Figure 21:
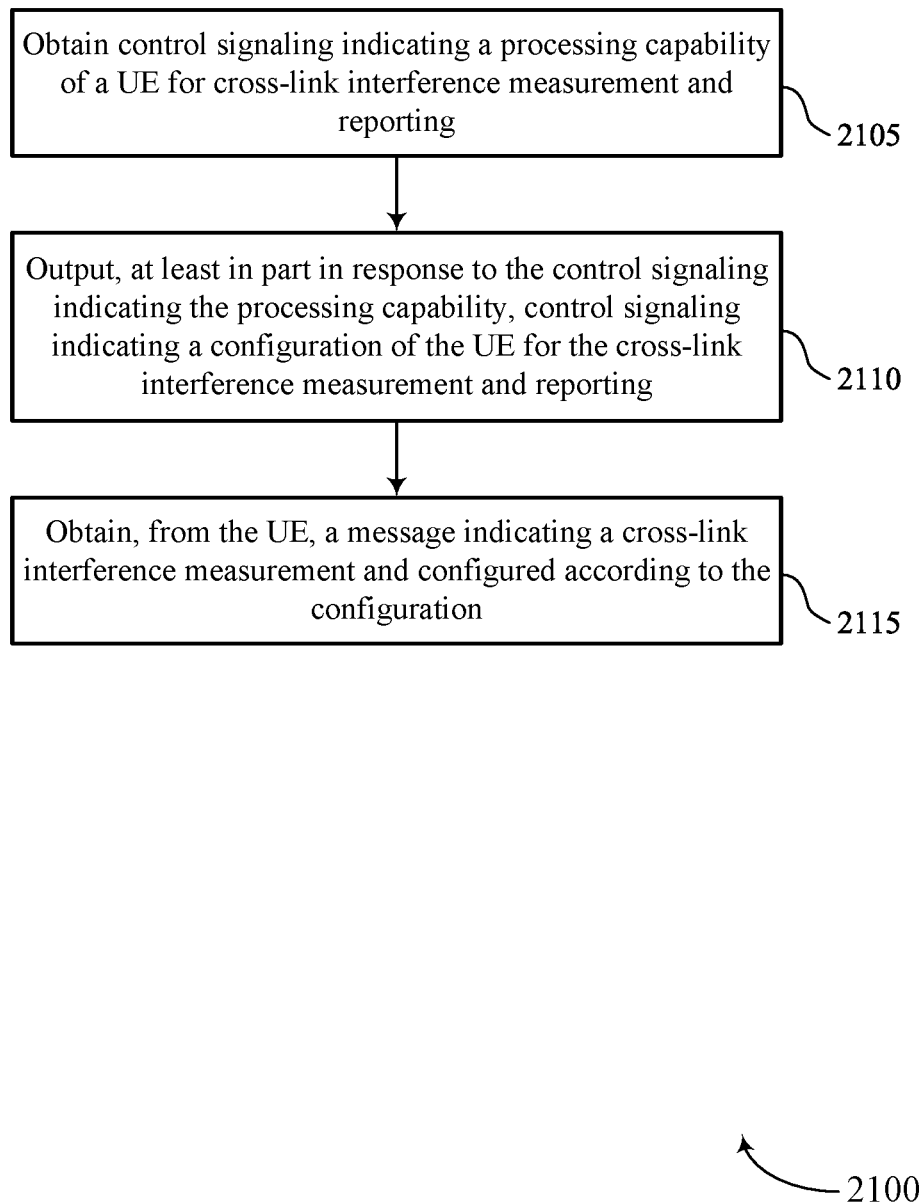

FIG. 21 shows a flowchart illustrating a method 2100 that supports UE processing capability aspects for cross-link interference measurement in accordance with one or more aspects of the present disclosure. The operations of the method 2100 may be implemented by a network entity or its components as described herein. For example, the operations of the method 2100 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2105, the method may include obtaining control signaling indicating a processing capability of a UE for cross-link interference measurement and reporting. The operations of 2105 may be performed in accordance with examples as disclosed herein. In some examples, aspects of the operations of 2105 may be performed by a capability component 1625 as described with reference to FIG. 16.

At 2110, the method may include outputting, at least in part in response to the control signaling indicating the processing capability, control signaling indicating a configuration of the UE for the cross-link interference measurement and reporting. The operations of 2110 may be performed in accordance with examples as disclosed herein. In some examples, aspects of the operations of 2110 may be performed by a configuration component 1630 as described with reference to FIG. 16.

At 2115, the method may include obtaining, from the UE, a message indicating a cross-link interference measurement and configured according to the configuration. The operations of 2115 may be performed in accordance with examples as disclosed herein. In some examples, aspects of the operations of 2115 may be performed by a message component 1635 as described with reference to FIG. 16.

Figure 22:
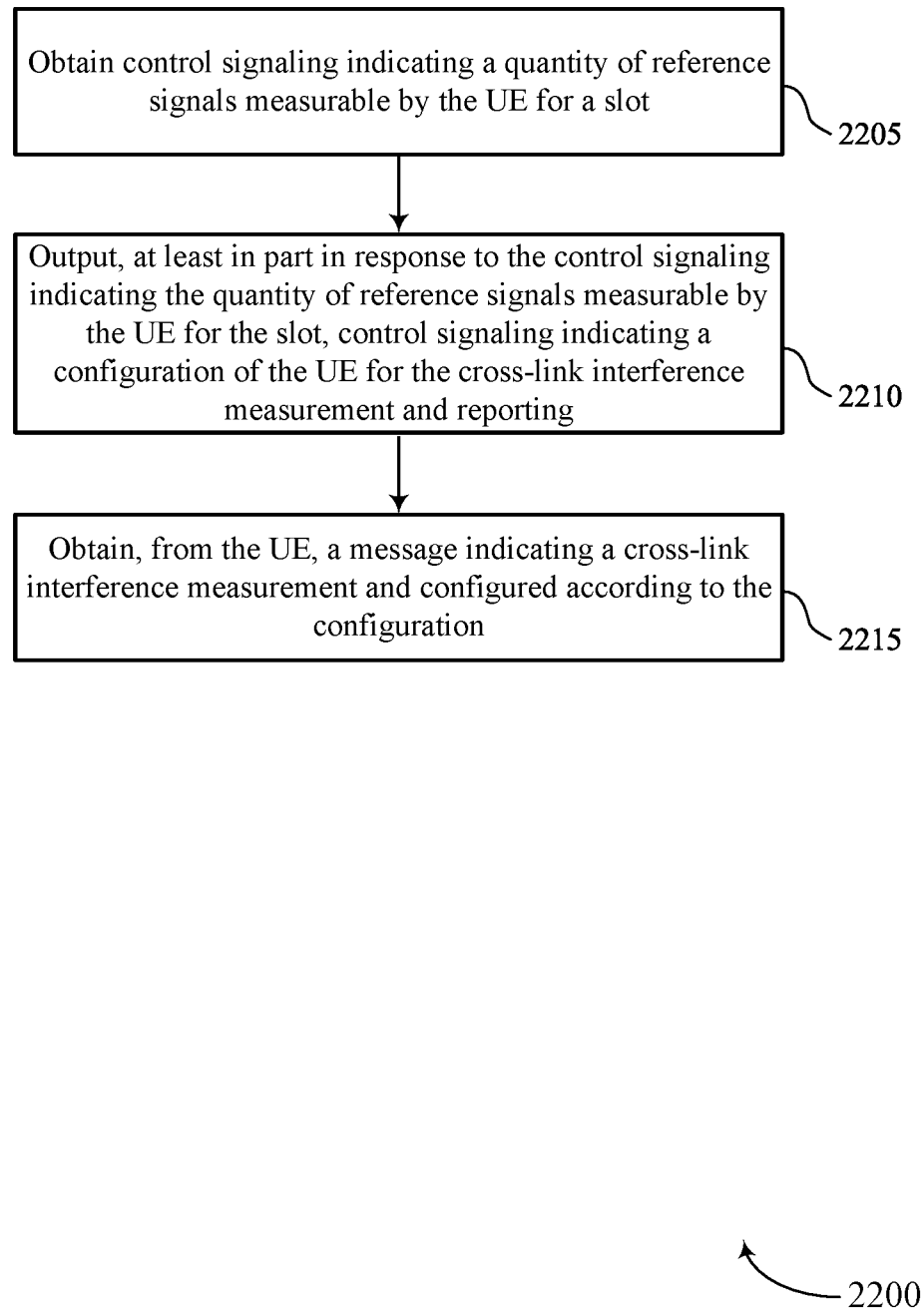

FIG. 22 shows a flowchart illustrating a method 2200 that supports UE processing capability aspects for cross-link interference measurement in accordance with one or more aspects of the present disclosure. The operations of the method 2200 may be implemented by a network entity or its components as described herein. For example, the operations of the method 2200 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2205, the method may include obtaining control signaling indicating a quantity of reference signals measurable by the UE for a slot. The operations of 2205 may be performed in accordance with examples as disclosed herein. In some examples, aspects of the operations of 2205 may be performed by a capability component 1625 as described with reference to FIG. 16.

At 2210, the method may include outputting, at least in part in response to the control signaling indicating a quantity of reference signals measurable by the UE for a slot, control signaling indicating a configuration of the UE for the cross-link interference measurement and reporting. The operations of 2210 may be performed in accordance with examples as disclosed herein. In some examples, aspects of the operations of 2210 may be performed by a configuration component 1630 as described with reference to FIG. 16.

At 2215, the method may include obtaining, from the UE, a message indicating a cross-link interference measurement and configured according to the configuration. The operations of 2215 may be performed in accordance with examples as disclosed herein. In some examples, aspects of the operations of 2215 may be performed by a message component 1635 as described with reference to FIG. 16.

Figure 23:
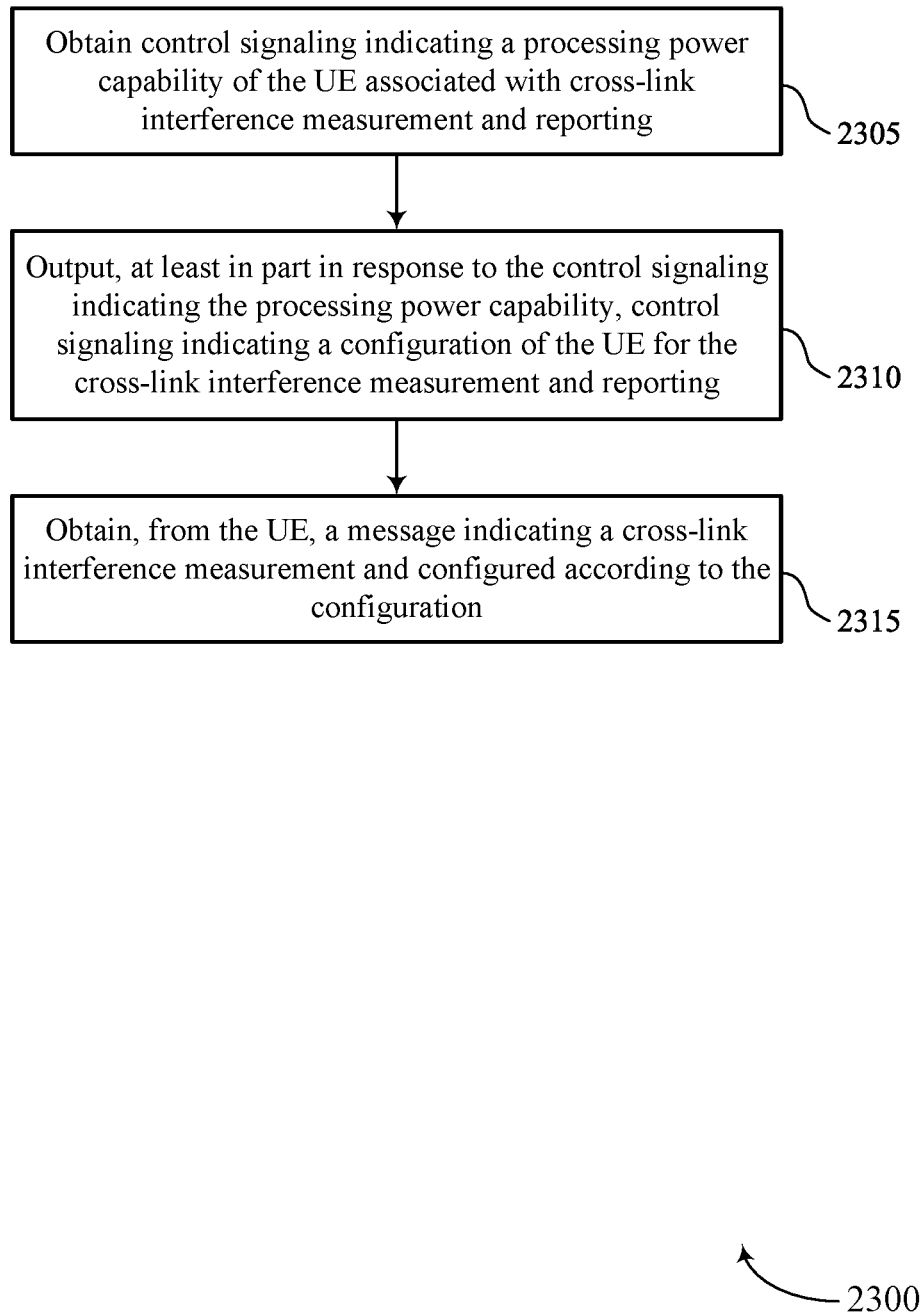

FIG. 23 shows a flowchart illustrating a method 2300 that supports UE processing capability aspects for cross-link interference measurement in accordance with one or more aspects of the present disclosure. The operations of the method 2300 may be implemented by a network entity or its components as described herein. For example, the operations of the method 2300 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2305, the method may include obtaining control signaling indicating a processing power capability of the UE associated with cross-link interference measurement and reporting. The operations of 2305 may be performed in accordance with examples as disclosed herein. In some examples, aspects of the operations of 2305 may be performed by a capability component 1625 as described with reference to FIG. 16.

At 2310, the method may include outputting, at least in part in response to the control signaling indicating the processing power capability, control signaling indicating a configuration of the UE for the cross-link interference measurement and reporting. The operations of 2310 may be performed in accordance with examples as disclosed herein. In some examples, aspects of the operations of 2310 may be performed by a configuration component 1630 as described with reference to FIG. 16.

At 2315, the method may include obtaining, from the UE, a message indicating a cross-link interference measurement and configured according to the configuration. The operations of 2315 may be performed in accordance with examples as disclosed herein. In some examples, aspects of the operations of 2315 may be performed by a message component 1635 as described with reference to FIG. 16.

The following provides an overview of aspects of the present disclosure:

Aspect 1: A method for wireless communication at a UE, comprising: transmitting control signaling indicating a processing capability of the UE for cross-link interference measurement and reporting; receiving, at least in part in response to the control signaling indicating the processing capability, control signaling indicating a configuration of the UE for the cross-link interference measurement and reporting; and transmitting, to a network entity, a message indicating a cross-link interference measurement generated by the UE according to the configuration.

Aspect 2: The method of aspect 1, wherein transmitting the control signaling indicating the processing capability comprises: transmitting control signaling indicating a quantity of reference signals measurable by the UE for a slot.

Aspect 3: The method of any of aspects 1 through 2, wherein transmitting the control signaling indicating the processing capability comprises: transmitting control signaling indicating a processing power capability of the UE associated with cross-link interference measurement and reporting.

Aspect 4: The method of aspect 3, wherein the processing power capability of the UE is per resource for cross-link interference measurement and reporting.

Aspect 5: The method of any of aspects 1 through 4, wherein transmitting the control signaling indicating the processing capability comprises: transmitting control signaling indicating a time duration for processing associated with cross-link interference measurement and reporting.

Aspect 6: The method of any of aspects 1 through 5, wherein transmitting the control signaling indicating the processing capability comprises: transmitting control signaling indicating an amount of processing available to the UE for cross-link interference measurement and reporting.

Aspect 7: The method of aspect 6, further comprising: determining that the processing available to the UE for cross-link interference measurement and reporting fails to satisfy a threshold; and determining whether to transmit the message indicating the cross-link interference measurement or a second message indicating a channel state information measurement based at least in part on the processing available failing to satisfy the threshold and comparing a first priority associated with the cross-link interference measurement and a second priority associated with the channel state information measurement.

Aspect 8: The method of any of aspects 1 through 7, wherein transmitting the control signaling indicating the processing capability comprises: transmitting control signaling indicating a processing timeline for a control message that triggers a cross-link interference measurement, the cross-link interference measurement, a cross-link interference report, or any combination thereof.

Aspect 9: The method of aspect 8, wherein the control signaling indicating the processing timeline comprises a first value associated with a first time interval from the control message that triggers the cross-link interference measurement to the cross-link interference report, a second value associated with a second time interval from the cross-link interference measurement and the cross-link interference report, or any combination thereof.

Aspect 10: The method of any of aspects 1 through 9, wherein transmitting the message indicating the cross-link interference measurement comprises: identifying a priority associated with the message indicating the cross-link interference measurement; and transmitting the message indicating the cross-link interference measurement according to the priority.

Aspect 11: The method of aspect 10, wherein the priority associated with the message indicating the cross-link interference measurement comprises a first priority, the method further comprising: identifying a second priority associated with a channel state information message to be transmitted on a same set of resources as the message indicating the cross-link interference measurement; and determining to transmit the message indicating the cross-link interference measurement and refrain from transmitting the channel state information message based at least in part on comparing the first priority to the second priority.

Aspect 12: The method of aspect 11, wherein the first priority is associated with both the message indicating the cross-link interference measurement and at least one type of channel state information message.

Aspect 13: The method of any of aspects 1 through 12, further comprising: receiving, on a downlink control channel according to the configuration, a DCI message that triggers a cross-link interference measurement; receiving one or more reference signals on a set of cross-link interference measurement resources according to the configuration and the DCI message; and generating the cross-link interference measurement based at least in part on the one or more reference signals, wherein the message indicating the cross-link interference measurement is transmitted on an uplink control channel or an uplink shared channel.

Aspect 14: A method for wireless communication at a network entity, comprising: obtaining control signaling indicating a processing capability of a UE for cross-link interference measurement and reporting; outputting, at least in part in response to the control signaling indicating the processing capability, control signaling indicating a configuration of the UE for the cross-link interference measurement and reporting; and obtaining, from the UE, a message indicating a cross-link interference measurement and configured according to the configuration.

Aspect 15: The method of aspect 14, wherein obtaining the control signaling indicating the processing capability comprises: obtaining control signaling indicating a quantity of reference signals measurable by the UE for a slot.

Aspect 16: The method of any of aspects 14 through 15, wherein obtaining the control signaling indicating the processing capability comprises: obtaining control signaling indicating a processing power capability of the UE associated with cross-link interference measurement and reporting.

Aspect 17: The method of any of aspects 14 through 16, wherein obtaining the control signaling indicating the processing capability comprises: obtaining control signaling indicating a time duration for processing associated with cross-link interference measurement and reporting.

Aspect 18: The method of any of aspects 14 through 17, wherein obtaining the control signaling indicating the processing capability comprises: obtaining control signaling indicating an amount of processing available to the UE for cross-link interference measurement and reporting.

Aspect 19: The method of any of aspects 14 through 18, wherein obtaining the control signaling indicating the processing capability comprises: obtaining control signaling indicating a processing timeline for a control message that triggers a cross-link interference measurement, the cross-link interference measurement, a cross-link interference report, or any combination thereof.

Aspect 20: The method of any of aspects 14 through 19, wherein obtaining the message indicating the cross-link interference measurement comprises: identifying a priority associated with the message indicating the cross-link interference measurement; and obtaining the message indicating the cross-link interference measurement according to the priority.

Aspect 21: The method of any of aspects 14 through 20, further comprising: outputting, on a downlink control channel according to the configuration, a DCI message that triggers a cross-link interference measurement; and outputting one or more reference signals on a set of cross-link interference measurement resources according to the configuration and based at least in part on the DCI message, wherein the message indicating the cross-link interference measurement is received on an uplink control channel or an uplink shared channel at least in part in response to the one or more reference signals.

Aspect 22: An apparatus for wireless communication at a UE, comprising a processor; memory coupled with the processor; and instructions stored in the memory and executable by the processor to cause the apparatus to perform a method of any of aspects 1 through 13.

Aspect 23: An apparatus for wireless communication at a UE, comprising at least one means for performing a method of any of aspects 1 through 13.

Aspect 24: A non-transitory computer-readable medium storing code for wireless communication at a UE, the code comprising instructions executable by a processor to perform a method of any of aspects 1 through 13.

Aspect 25: An apparatus for wireless communication at a network entity, comprising a processor; memory coupled with the processor; and instructions stored in the memory and executable by the processor to cause the apparatus to perform a method of any of aspects 14 through 21.

Aspect 26: An apparatus for wireless communication at a network entity, comprising at least one means for performing a method of any of aspects 14 through 21.

Aspect 27: A non-transitory computer-readable medium storing code for wireless communication at a network entity, the code comprising instructions executable by a processor to perform a method of any of aspects 14 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors to cause the apparatus to:
      transmit control signaling indicating a processing capability of the UE for cross-link interference measurement and reporting;
      receive, at least in part in response to the control signaling indicating the processing capability, control signaling indicating a configuration of the UE for the cross-link interference measurement and reporting;
      receive, on a downlink control channel according to the configuration, a downlink control information message that triggers a cross-link interference measurement;
      receive one or more reference signals on a set of cross-link interference measurement resources according to the configuration and the downlink control information message;
      generate the cross-link interference measurement based at least in part on the one or more reference signals; and
      transmit, to a network entity, a message indicating the cross-link interference measurement generated by the UE according to the configuration, wherein the message is transmitted on an uplink control channel or an uplink shared channel.

2. The apparatus of claim 1, wherein the instructions to transmit the control signaling indicating the processing capability are executable by the one or more processors to cause the apparatus to:
   transmit control signaling indicating a quantity of reference signals measurable by the UE for a slot.

3. The apparatus of claim 1, wherein the instructions to transmit the control signaling indicating the processing capability are executable by the one or more processors to cause the apparatus to:
   transmit control signaling indicating a processing power capability of the UE associated with cross-link interference measurement and reporting.

4. The apparatus of claim 3, wherein the processing power capability of the UE is per resource for cross-link interference measurement and reporting.

5. The apparatus of claim 1, wherein the instructions to transmit the control signaling indicating the processing capability are executable by the one or more processors to cause the apparatus to:
   transmit control signaling indicating a time duration for processing associated with cross-link interference measurement and reporting.

6. The apparatus of claim 1, wherein the instructions to transmit the control signaling indicating the processing capability are executable by the one or more processors to cause the apparatus to:
   transmit control signaling indicating an amount of processing available to the UE for cross-link interference measurement and reporting.

7. The apparatus of claim 6, wherein the instructions are further executable by the one or more processors to cause the apparatus to:
determine that the processing available to the UE for cross-link interference measurement and reporting fails to satisfy a threshold; and
determine whether to transmit the message indicating the cross-link interference measurement or a second message indicating a channel state information measurement based at least in part on the processing available failing to satisfy the threshold and comparing a first priority associated with the cross-link interference measurement and a second priority associated with the channel state information measurement.

8. The apparatus of claim 1, wherein the instructions to transmit the control signaling indicating the processing capability are executable by the one or more processors to cause the apparatus to:
transmit control signaling indicating a processing timeline for a control message that triggers a cross-link interference measurement, the cross-link interference measurement, a cross-link interference report, or any combination thereof.

9. The apparatus of claim 8, wherein the control signaling indicating the processing timeline comprises a first value associated with a first time interval from the control message that triggers the cross-link interference measurement to the cross-link interference report, a second value associated with a second time interval from the cross-link interference measurement to the cross-link interference report, or any combination thereof.

10. The apparatus of claim 1, wherein the instructions to transmit the message indicating the cross-link interference measurement are executable by the one or more processors to cause the apparatus to:
identify a priority associated with the message indicating the cross-link interference measurement; and
transmit the message indicating the cross-link interference measurement according to the priority.

11. The apparatus of claim 10, wherein the priority associated with the message indicating the cross-link interference measurement comprises a first priority, and the instructions are further executable by the one or more processors to cause the apparatus to:
identify a second priority associated with a channel state information message to be transmitted on a same set of resources as the message indicating the cross-link interference measurement; and
determine to transmit the message indicating the cross-link interference measurement and refrain from transmitting the channel state information message based at least in part on comparing the first priority to the second priority.

12. The apparatus of claim 11, wherein the first priority is associated with both the message indicating the cross-link interference measurement and at least one type of channel state information message.

13. An apparatus for wireless communication at a network entity, comprising:
one or more processors;
one or more memories coupled with the one or more processors; and
instructions stored in the one or more memories and executable by the one or more processors to cause the apparatus to:
obtain control signaling indicating a processing capability of a user equipment (UE) for cross-link interference measurement and reporting;
output, at least in part in response to the control signaling indicating the processing capability, control signaling indicating a configuration of the UE for the cross-link interference measurement and reporting;
output, on a downlink control channel according to the configuration, a downlink control information message that triggers a cross-link interference measurement;
output one or more reference signals on a set of cross-link interference measurement resources according to the configuration and based at least in part on the downlink control information message; and
obtain, from the UE, a message indicating the cross-link interference measurement and configured according to the configuration, wherein the message is received on an uplink control channel or an uplink shared channel at least in part in response to the one or more reference signals.

14. The apparatus of claim 13, wherein the instructions to obtain the control signaling indicating the processing capability are executable by the one or more processors to cause the apparatus to:
obtain control signaling indicating a quantity of reference signals measurable by the UE for a slot.

15. The apparatus of claim 13, wherein the instructions to obtain the control signaling indicating the processing capability are executable by the one or more processors to cause the apparatus to:
obtain control signaling indicating a processing power capability of the UE associated with cross-link interference measurement and reporting.

16. The apparatus of claim 13, wherein the instructions to obtain the control signaling indicating the processing capability are executable by the one or more processors to cause the apparatus to:
obtain control signaling indicating a time duration for processing associated with cross-link interference measurement and reporting.

17. The apparatus of claim 13, wherein the instructions to obtain the control signaling indicating the processing capability are executable by the one or more processors to cause the apparatus to:
obtain control signaling indicating an amount of processing available to the UE for cross-link interference measurement and reporting.

18. The apparatus of claim 13, wherein the instructions to obtain the control signaling indicating the processing capability are executable by the one or more processors to cause the apparatus to:
obtain control signaling indicating a processing timeline for a control message that triggers a cross-link interference measurement, the cross-link interference measurement, a cross-link interference report, or any combination thereof.

19. The apparatus of claim 13, wherein the instructions to obtain the message indicating the cross-link interference measurement are executable by the one or more processors to cause the apparatus to:
identify a priority associated with the message indicating the cross-link interference measurement; and
obtain the message indicating the cross-link interference measurement according to the priority.

20. A method for wireless communication at a user equipment (UE), comprising:
- transmitting control signaling indicating a processing capability of the UE for cross-link interference measurement and reporting;
- receiving, at least in part in response to the control signaling indicating the processing capability, control signaling indicating a configuration of the UE for the cross-link interference measurement and reporting;
- receiving, on a downlink control channel according to the configuration, a downlink control information message that triggers a cross-link interference measurement;
- receiving one or more reference signals on a set of cross-link interference measurement resources according to the configuration and the downlink control information message;
- generating the cross-link interference measurement based at least in part on the one or more reference signals; and
- transmitting, to a network entity, a message indicating the cross-link interference measurement generated by the UE according to the configuration, wherein the message is transmitted on an uplink control channel or an uplink shared channel.

21. The method of claim 20, wherein transmitting the control signaling indicating the processing capability comprises:
- transmitting control signaling indicating a quantity of reference signals measurable by the UE for a slot.

22. The method of claim 20, wherein transmitting the control signaling indicating the processing capability comprises:
- transmitting control signaling indicating a processing power capability of the UE associated with cross-link interference measurement and reporting.

23. The method of claim 20, wherein transmitting the control signaling indicating the processing capability comprises:
- transmitting control signaling indicating a time duration for processing associated with cross-link interference measurement and reporting.

24. The method of claim 20, wherein transmitting the control signaling indicating the processing capability comprises:
- transmitting control signaling indicating an amount of processing available to the UE for cross-link interference measurement and reporting.

25. The method of claim 20, wherein transmitting the control signaling indicating the processing capability comprises:
- transmitting control signaling indicating a processing timeline for a control message that triggers a cross-link interference measurement, the cross-link interference measurement, a cross-link interference report, or any combination thereof.

26. A method for wireless communication at a network entity, comprising:
- obtaining control signaling indicating a processing capability of a user equipment (UE) for cross-link interference measurement and reporting;
- outputting, at least in part in response to the control signaling indicating the processing capability, control signaling indicating a configuration of the UE for the cross-link interference measurement and reporting;
- outputting, on a downlink control channel according to the configuration, a downlink control information message that triggers a cross-link interference measurement;
- outputting one or more reference signals on a set of cross-link interference measurement resources according to the configuration and based at least in part on the downlink control information message; and
- obtaining, from the UE, a message indicating the cross-link interference measurement and configured according to the configuration, wherein the message is received on an uplink control channel or an uplink shared channel at least in part in response to the one or more reference signals.

27. The method of claim 26, wherein obtaining the control signaling indicating the processing capability comprises:
- obtaining control signaling indicating a quantity of reference signals measurable by the UE for a slot.

28. The method of claim 26, wherein obtaining the control signaling indicating the processing capability comprises:
- obtaining control signaling indicating a processing power capability of the UE associated with cross-link interference measurement and reporting.

* * * * *